US010992741B2

(12) United States Patent
Dowd et al.

(10) Patent No.: US 10,992,741 B2
(45) Date of Patent: Apr. 27, 2021

(54) SYSTEM AND METHOD FOR PROVIDING A CONFIGURATION FILE TO CLIENT DEVICES

(71) Applicant: Wickr Inc., San Francisco, CA (US)

(72) Inventors: Christopher Dowd, Belleville, NJ (US); Christopher Lalonde, Austin, TX (US); Thomas Michael Leavy, River Edge, NJ (US); Arjun Bhatnagar, Matawan, NJ (US); Dipakkumar R. Kasabwala, Edison, NJ (US); David Lautz, New York, NY (US); Matthew Downs, Brooklyn, NY (US)

(73) Assignee: Wickr Inc., Pleasanton, CA (US)

( * ) Notice: Subject to any disclaimer, the term of this patent is extended or adjusted under 35 U.S.C. 154(b) by 204 days.

(21) Appl. No.: 16/102,132

(22) Filed: Aug. 13, 2018

(65) Prior Publication Data

US 2020/0053145 A1    Feb. 13, 2020

(51) Int. Cl.
*H04L 29/08* (2006.01)
(52) U.S. Cl.
CPC ................ *H04L 67/1002* (2013.01)
(58) Field of Classification Search
CPC . H04L 41/12; H04L 41/0816; H04L 43/0811; H04L 61/1511; H04L 63/20; H04L 67/34; H04L 67/1002; H04L 67/2838; H04L 69/28
See application file for complete search history.

(56) References Cited

U.S. PATENT DOCUMENTS

| 7,222,228 | B1 | 5/2007 | Stephens et al. |
| 7,383,326 | B1 * | 6/2008 | Himberger ............. H04L 67/34 709/203 |
| 8,134,954 | B2 | 3/2012 | Godfrey et al. |
| 8,966,018 | B2 | 2/2015 | Bugwadia et al. |
| 2004/0136358 | A1 | 7/2004 | Hind et al. |
| 2009/0228973 | A1 | 9/2009 | Kumar et al. |

(Continued)

OTHER PUBLICATIONS

Dec. 31, 2020, U.S., Non-Final Office Action of U.S. Appl. No. 16/102,136.

*Primary Examiner* — Clayton R Williams
*Assistant Examiner* — Michael Li
(74) *Attorney, Agent, or Firm* — Banner & Witcoff, Ltd.

(57) ABSTRACT

A solution for circumventing censorship is disclosed. A first device connects to a first server hosted in a content delivery network (CDN). The CDN routes the first device's connection request to the first server. The first server responds by providing the first device with a configuration file that contains a plurality of secondary servers for the first device to access. Accordingly, the first device disconnects from the first server and hops between one or more of the plurality of secondary servers contained in the configuration file. By distributing the configuration file from a first server hosted in a CDN, the first device is able to obfuscate the true endpoint of the connection. Thus, the first device is able to obtain the configuration file without drawing the ire of censors. By hopping from server-to-server, the first device is able to stay one-step ahead of censors. Accordingly, the present disclosure describes a multi-prong approach to staying a step ahead of eavesdroppers, sniffers, and censors.

18 Claims, 17 Drawing Sheets

(56) References Cited

U.S. PATENT DOCUMENTS

| | | |
|---|---|---|
| 2010/0211776 A1 | 8/2010 | Gunaseelan et al. |
| 2015/0046707 A1 | 2/2015 | Atherton |
| 2015/0161626 A1 | 6/2015 | Chu |
| 2015/0195182 A1* | 7/2015 | Mathur ............... H04L 41/0866 714/27 |
| 2016/0359667 A1* | 12/2016 | Tukol .................... G06F 9/4416 |
| 2016/0373372 A1* | 12/2016 | Gillon ..................... H04L 69/14 |
| 2017/0078160 A1 | 3/2017 | Hong et al. |

\* cited by examiner

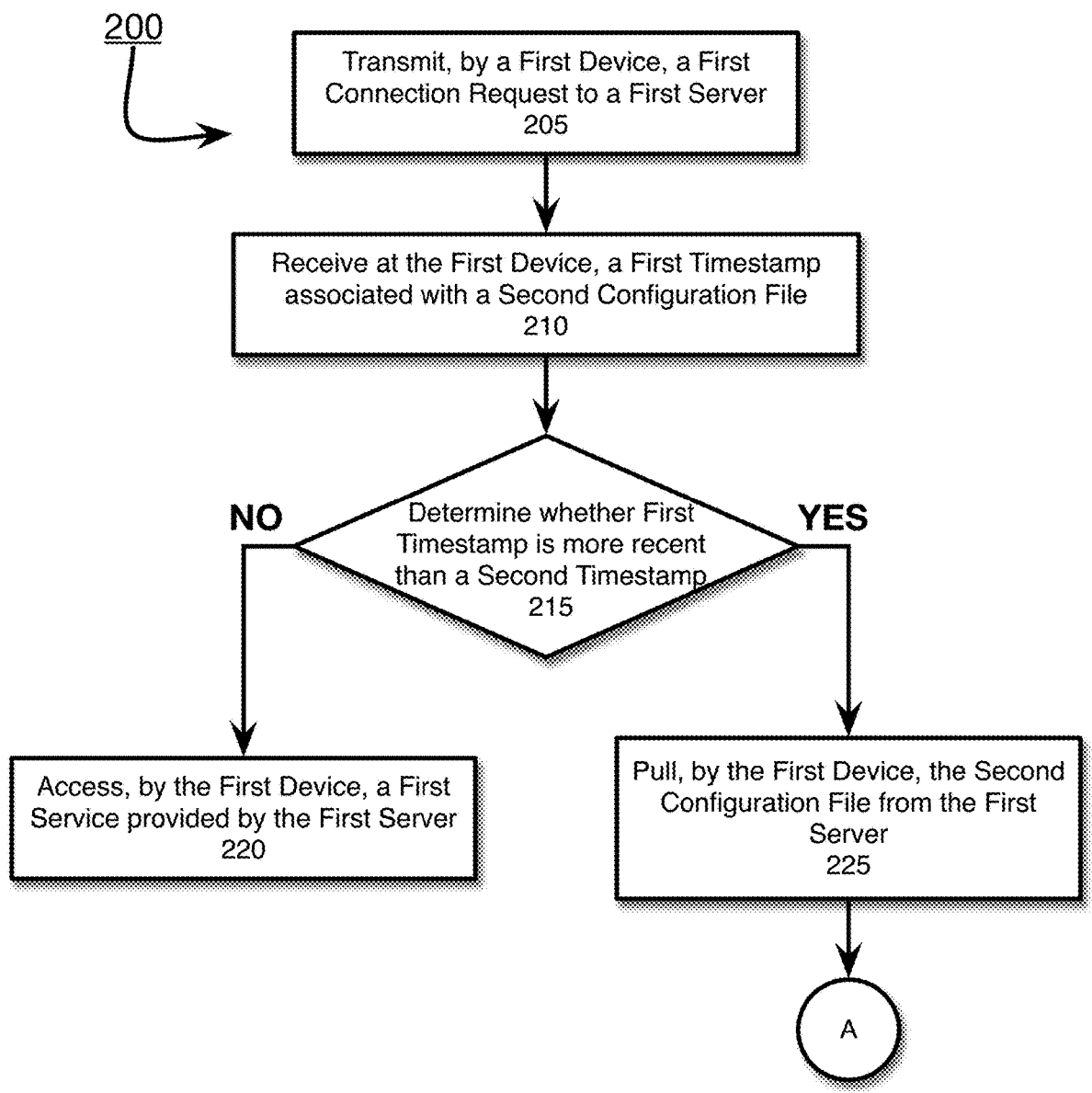

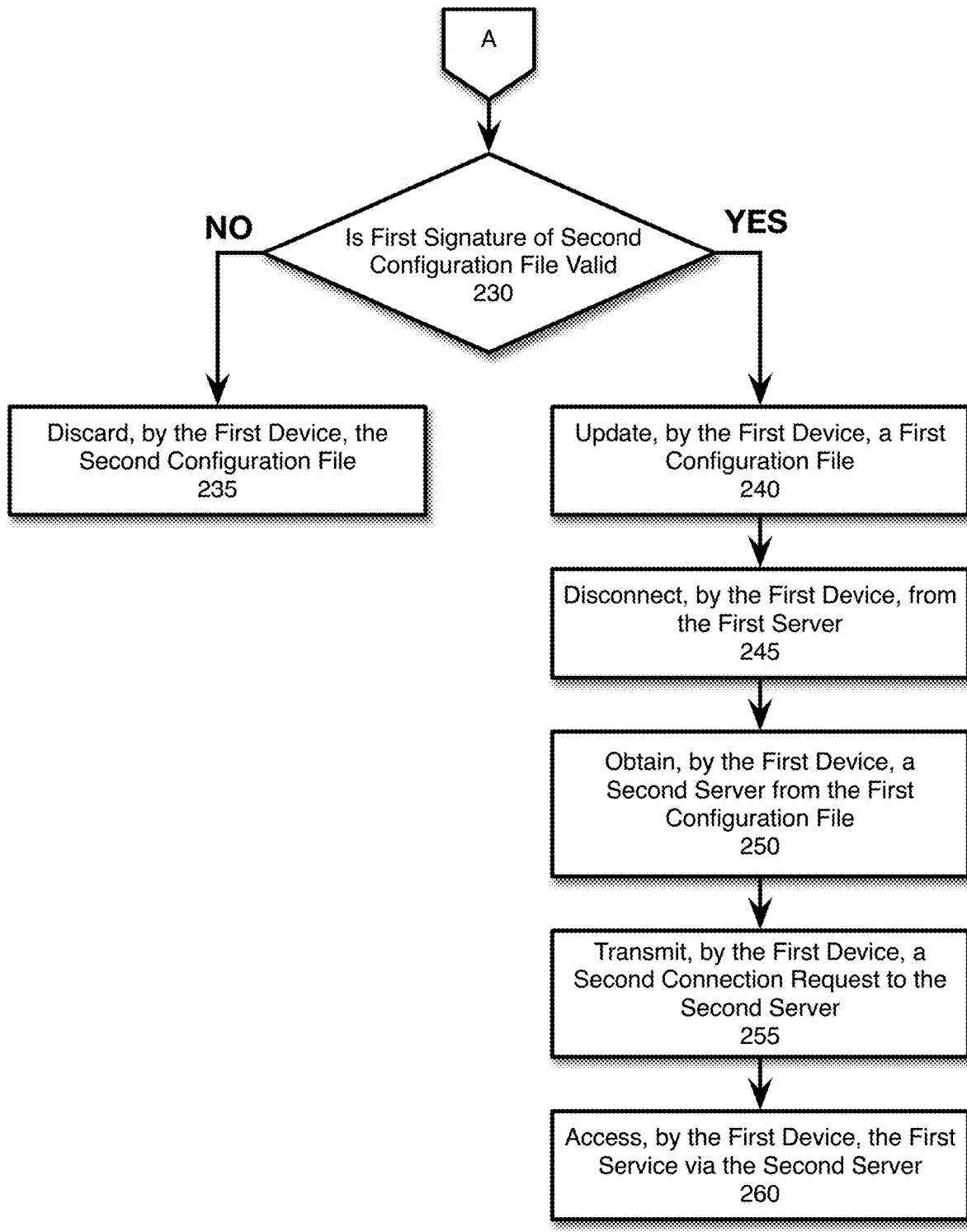

SYSTEM AND METHOD FOR PROVIDING A CONFIGURATION FILE TO CLIENT DEVICES

STATEMENT REGARDING FEDERALLY SPONSORED RESEARCH OR DEVELOPMENT

This invention was made with Government support under Contract No. 2014-14031000011 awarded by the Central Intelligence Agency. The Government has certain rights in the invention.

CROSS-REFERENCE TO RELATED APPLICATIONS

This application is related to U.S. application Ser. No. 16/102,136, entitled "System and Method for Providing a Configuration File to Client Devices," filed on Aug. 13, 2018, the entirety of which is hereby incorporated by reference.

BACKGROUND OF THE INVENTION

Content Distribution Networks (CDNs), like Cloudflare®, Google® Cloud, and Amazon® Web Services, provide hosting services for web pages and back-end applications (collectively "services"). Aside from the benefits provided by hosting services, CDNs mitigate against denial-of-service (DoS) and other attacks, and an ancillary benefit of CDNs is domain fronting.

Domain fronting is a technique that allows a user or application to circumvent censorship by allowing the user or application to connect to a blocked service, while appearing to connect to a different, unblocked service. In operation, the user or application makes a request via a secure connection, such as HTTPS, to the unblocked service. The request includes two domain names: a first domain name that identifies the unblocked services, such as the CDN, and is transmitted in cleartext, and a second domain name that identifies a true endpoint for the request. The second domain name is encrypted in the payload of the request and, therefore, hidden from censors. The CDN is able to decrypt the payload of the request and obtain the second domain name. Accordingly, the CDN routes the request to the true endpoint (i.e. the second domain name) away from the prying eyes of censors. Thus, domain fronting has proven a useful tool in circumventing censorship.

However, censors are putting pressure on CDNs to curtail domain fronting. Most notably, certain autocratic governments have taken steps to censor secure communication channels by blocking access to the CDNs themselves. While these governments were successful in blocking access to the secure communication channels, there was also collateral damage. In particular, the censors blocked access to services that would not have been censored but for the fact that the services were hosted on the same CDN as that of the censors' target. Due to pressure from censors and the governments behind them, CDNs are taking steps to prevent websites and back-end servers from taking advantage of the benefits provided by domain fronting.

Accordingly, there is a technical problem of how to provide access to services that would otherwise be blocked by censors in order to support freedom of speech, freedom of expression, and freedom of association.

BRIEF SUMMARY OF THE INVENTION

The present disclosure describes a technical solution that circumvents censorship of services by capitalizing on the advantages provided by domain fronting. In particular, a service is hosted in a content delivery network (CDN). In order to access the service, a first client device transmits a first connection request to the CDN via a secure channel. The first connection request includes a first domain name and a second, encrypted domain name that is different from the first domain name. The CDN decrypts the second domain name and routes the connection request to the first server. Accordingly, the endpoint (i.e. the second domain name) of the first connection request is hidden from eavesdroppers, sniffers, and censors.

To further stay a step ahead of eavesdroppers, sniffers, and censors, the present disclosure also describes a server-hopping technique. To implement the server-hopping technique, the first server provides the first client device with a second configuration file. The second configuration file includes a plurality of secondary back-end servers. The plurality of secondary servers provide access to the same service hosted by the CDN. Accordingly, the first client device closes the connection to the first server and transmits a second connection request to one of the plurality of secondary servers. For each subsequent connection request, the first client device selects a different secondary server from the plurality of secondary servers. Thus, the first client device is server-hopping and staying one-step ahead of eavesdroppers, sniffers, and censors.

While the distribution of the first configuration file allows for client devices to server-hop, additional benefits are realized too. For example, distributing configuration files using the above techniques allow corporate entities to deliver configuration updates to client devices. In particular, the distribution techniques described herein improve the security and efficiency of deployments, security policy updates, patching bugs, and rolling-out updates, to name a few.

BRIEF DESCRIPTION OF THE DRAWINGS

Various embodiments of the invention are disclosed in the following detailed description and the accompanying drawings.

FIGS. 2A and 2B show a process for obtaining a first configuration file according to a first embodiment of the disclosure.

DETAILED DESCRIPTION

Figure 1A:
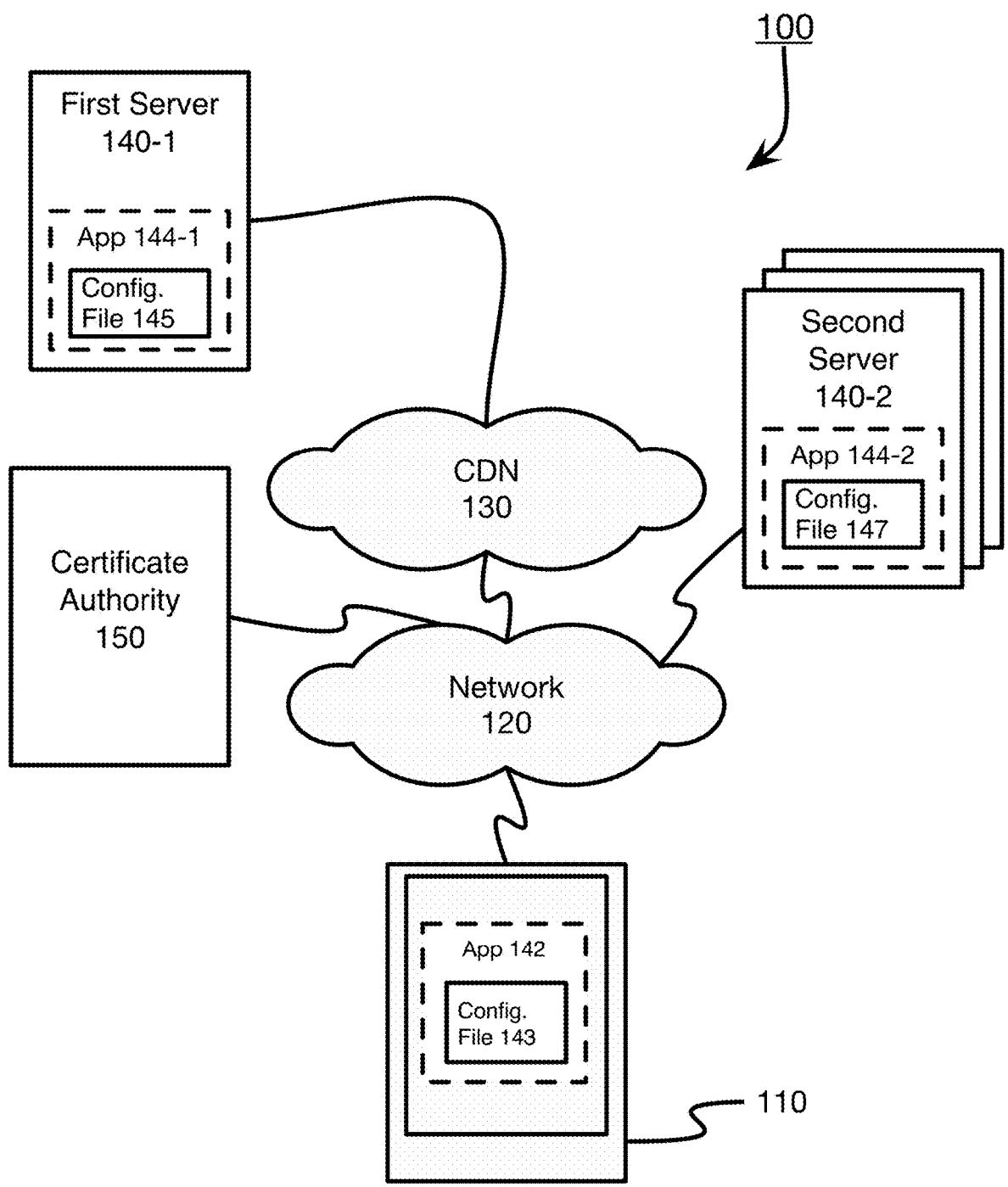
FIGS. 1A and 1B illustrates an exemplary system according to an exemplary embodiment of the disclosure.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The embodiments described herein with reference to the accompanying drawings, in which like reference numerals may refer to identical or functionally similar elements. Further, the terminology used herein is for the purpose of describing particular embodiments only and is not intended to be limiting of the disclosed embodiments. As used herein, the singular forms "a," "an," and "the" are included to include the plural forms as well, unless context clearly defines otherwise. It will be further understood that the terms "comprises" and/or "comprising," when used in the specification, specify the presence of stated features, integers, steps, operations, elements, and/or components, but do not preclude the presence of one or more additional features, integers, steps, operations, elements, and/or groups thereof.

Unless otherwise defined, all terms (including technical and scientific terms) used herein shall be given their plain and ordinary meaning as understood by one of ordinary skill in the art. It will be further understood that terms such as those defined in commonly used dictionaries, should be interpreted as having a meaning that is consistent with their meaning in the context of the relevant art and will not be interpreted in an idealized or overly formal sense unless expressly so defined herein.

The present invention may be embodied as a method, system, and/or as computer program instructions stored on a non-transitory computer-readable medium. Accordingly, the embodiments may take the form of hardware, software, or a combination thereof. Any suitable non-transitory computer-readable medium or processor-readable medium may be utilized including, for example, but not limited to, hard disks, USB Flash Drives, DVDs, CD-ROMs, optical storage devices, magnetic storage devices, etc. The instructions may be written in any suitable programming and/or scripting language, such as Java, C, C++, C#, Python, erlang, PHP, etc.

The disclosed embodiments are described, in part below, with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general-purpose computer, special-purpose computer, or other programmable data processing apparatus to produce a machine such that the instructions, which execute via the processor of the computer or other programmable data processing apparatus, create means for implementing the functions/acts specified in the block or blocks.

Note that the instructions described herein such as, for example, the operations/instructions and steps discussed herein, and any other processes described herein can be implemented in the context of hardware and/or software. In the context of software, such operations/instructions of the methods described herein can be implemented as, for example, computer-executable instructions such as program modules being executed by a single computer or a group of computers or other processors and processing devices. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, tablet computers, remote control devices, wireless handheld devices, Smartphones, mainframe computers, servers, and the like.

The term module, as utilized herein, may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code or machine code that actually implements the routines in the module. The term module may also simply refer to an application such as a computer program designed to assist in the performance of a specific task such as word processing, accounting, inventory management, etc. Additionally, the term "module" can also refer in some instances to a hardware component such as a computer chip or other hardware.

Alternatively, each block, and/or combinations of blocks, may be implemented by special purpose hardware, software, or firmware operating on special or general-purpose data processors, or combinations thereof. It should also be noted that, in some alternative implementations, the operations noted in the blocks may occur in an order different from the one indicated in the figures. For example, two blocks shown in succession may in fact be executed substantially concurrently, or the blocks may sometimes be executed in the reverse order, or the varying embodiments described herein can be combined with one another or portions of such embodiments can be combined with portions of other embodiments in another embodiment.

The present disclosure describes a system, method, and non-transitory computer-readable medium that includes instructions for circumventing censorship by distributing a configuration file via a first server hosted in a content delivery network (CDN). The first client device then uses a plurality of second servers contained in the configuration file to connect to at each subsequent login. Thus, the first client device is able to avoid censors. FIG. 1A illustrates a system 100 for distributing the configuration file via the CDN. System 100 includes a first client device 110 connected to CDN 130—which hosts a first server 140-1, second server 140-2, and certificate authority 150 via network 120. Network 120 includes various configurations and uses various protocols. For example, network 120 may include the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

First client device 110 is a computing device. In preferred embodiments, first client device 110 is a mobile device, such as a smart phone, tablet, or laptop. Alternatively, first device is a desktop computer. First client device 110 includes a first client application 142 that includes a first configuration file 143. According to some embodiments, first client application 142 is a secure collaboration application configured to transmit and receive encrypted communications, transfer encrypted files, conduct encrypted audio and video calling, and provide encrypted screen sharing. First configuration file 143 is a file configured to define one or more parameters and/or settings of first client application 142. Preferably, the one or more parameters and/or settings are defined by the application developer. Alternatively, the one or more parameters and/or settings are defined by a network administrator that has deployed first client application 142 on first client device 110. In some embodiments, the one or more parameters and/or settings are set by an application developer and, subsequently, updated by the network administrator.

The one or more parameters and/or settings defined by first configuration file 143 include a plurality of features. In this regard, first configuration file 143 may define how long communications are stored on first client device 110 before being deleted from first client device 110. Alternatively, first configuration file 143 may define which features of first client application 142 are available to a user of first client device 110. For example, the user of first client device 110 is allowed to send and receive encrypted communications and conduct encrypted audio calls, but not encrypted video calls or screen sharing. In additional embodiments, first configuration file 143 defines one or more network settings for first client application 142. In particular, the one or more network settings establish the back-end server that first client device 110 connects to in order to make use of first client application 142. In preferred embodiments, first configuration file 143 establishes that first client application 142 connects to first server 140-1 via CDN 130.

First server 140-1 is a server configured to host back-end services. In preferred embodiments, first server 140-1 is hosted by CDN 130. Alternatively, first server 140-1 is a server located in a server farm or cloud-computing environment, one or more virtual machines, a stand-alone server, or a corporate server. In operation, first server 140-1 hosts a first server application 144-1 that includes a second configuration file 145. First server application 144-1 is, preferably, a back-end application that interfaces with first client application 142. In this regard, first server application 144-1 may be provided as either a Software as a Service (SaaS) or a bare-metal environment executing on one or more customer servers. As will be discussed in greater detail below, first server application 144-1 stores a plurality of data and information for both first server application 144-1 and first client application 142. This data and information includes a second configuration file 145. In preferred embodiments, second configuration file 145 is configured to change or update the parameters and settings of first configuration file 143, including which back-end server first client application 142 connects to. In preferred embodiments, second configuration file 142 includes a plurality of second servers that first client application 142 connects to. In these embodiments, configuration files include a certificate for each of the plurality of servers contained in the configuration file. The certificate identifies the public key associated with the second server.

CDN 130 is a content delivery network. Content delivery networks are geographically distributed networks of proxy servers and data centers. As discussed above, content delivery networks distribute services, such as hosting services, in order to ensure high availability and high performance. Accordingly, an application developer pays to host their services on the content delivery network.

Second server 140-2 is another back-end server that is configured to host back-end services. In preferred embodiment, the backed-end servers are accessible by first client device 110. In practice, a plurality of second servers 140-2 are present and available for first client device 110 to choose from. Similar to first server 140-1, second server 140-2 is a server located in a server farm or cloud-computing environment, one or more virtual machines, a stand-alone server, or a corporate server. In operation, second server 140-2 hosts a second server application 144-2 that includes a third configuration file 147. In preferred embodiments, second server application 144-2 is a second instantiation of first server application 144-1. Accordingly, first client application 142, executing on first client device 110, access second server application 144-2 in lieu of access first server application 144-1.

System 100 also include a first certificate authority 150. First certificate authority 150 is a trusted third party that verifies information contained in a certificate. In preferred embodiments, first server 140-1 and second server 140-2 have a first certificate and a second certificate that contain a first and second public key, respectively. When first client device 110 attempts to connect to either the first server 140-1 or the second server 140-2, first client device 110 verifies the certificate associated with first server 140-1, second server 140-2, or both with first certificate authority 150.

Figure 1B:
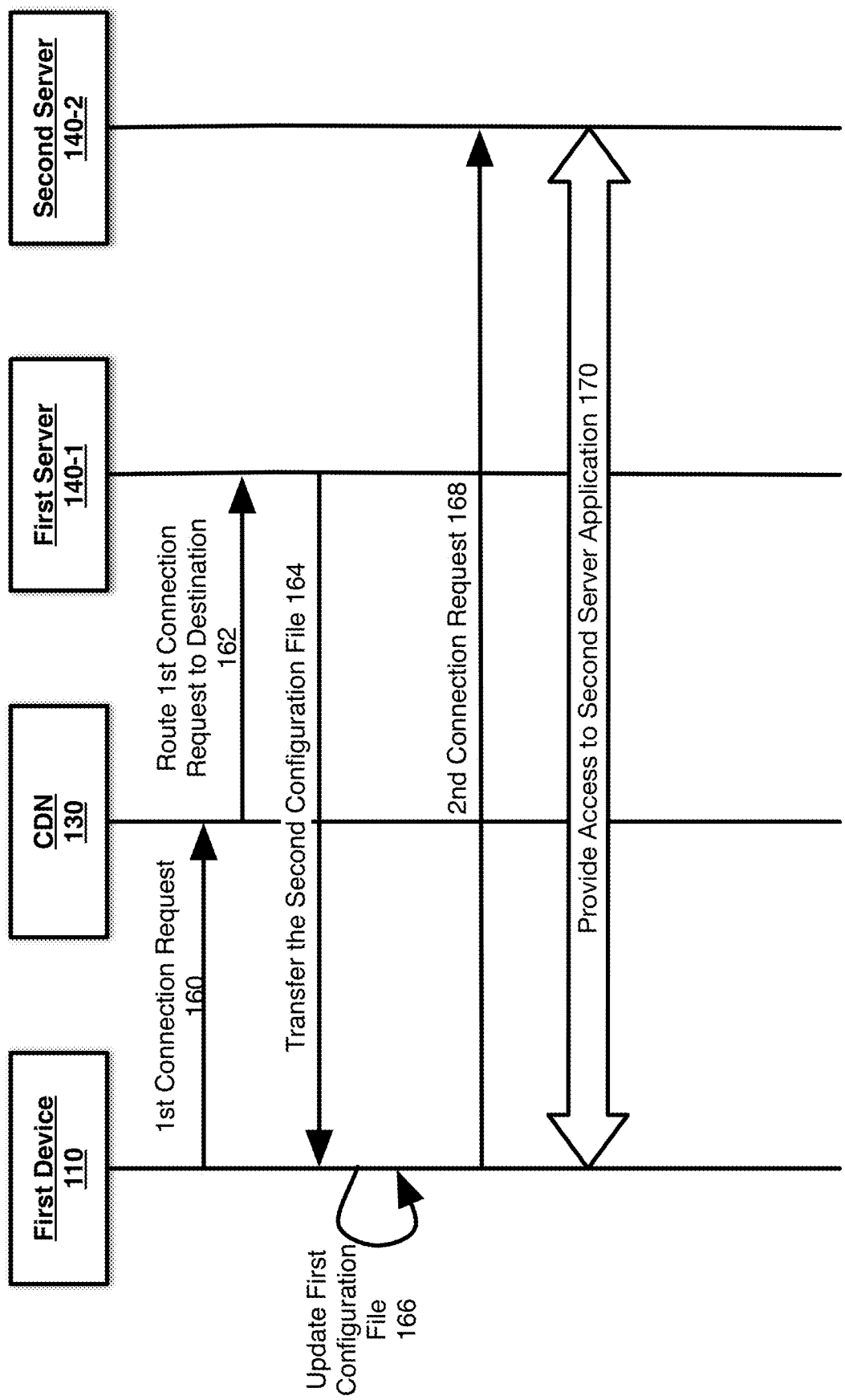

Turning to FIG. 1B, an exemplary flow of updating first configuration file 143 on first client device 110 and accessing a second server 140-2 using the updated first configuration file is shown. The flow begins at step 160 with first client device 110 transmitting a first connection request to CDN 130. The first connection request is an application programming interface (API) call, such as a REST API call, from first client application 142 to first server application 144-1. Alternatively, the first connection request is a request for information, such as an HTTP GET. In preferred embodiments, the first connection request is made over a secure channel, such as an internet connection secured according to Transport Layer Security (TLS). In practice, the first connection request includes a first header and a second header. The first header is plaintext and identifies the CDN as the destination. The second header is encrypted and identifies the endpoint of the first connection request. Accordingly, an eavesdropper or censor that intercepted the first connection request would recognize the endpoint as the CDN, instead of the true endpoint of first server 140-1. By encrypting the second header, first client device 110 and first server 140-1 circumvent eavesdroppers and censors via CDN 130.

Upon receiving the first connection request, CDN 130 decrypts the second header to obtain the endpoint of the first connection request. At step 162, CDN 130 routes the first connection request to first server 140-1. In some embodiments, first server 140-1 provides first client device 110 with access to first server application 144-1. Additionally, first server 140-1 updates the first configuration file 143 by transferring a second configuration file to first client device 110 in step 164.

In step 166, first client application 142, executing on first client device 110, receives the second configuration file from first server 140-1 and updates the first configuration file 143. As noted above, updating first configuration file 143 includes updating the network configuration settings and, more specifically, the back-end servers which first client application 142 connects. Thus, first client device 110 uses the updated network configuration settings for subsequent connection attempts.

In step 168, first client application 142, executing on first client device 110, selects a second server 140-2 from the updated network configuration settings and transmits a second connection request to the second server 140-2. In some embodiments, the second connection request is transmitted directly to second server 140-2. Alternatively, second server 140-2 is hosted in a CDN. Accordingly, the second connection request is in a similar format to the first connection request transmitted to first server 140-1. In step 170, second server 140-2 provides first client application 142 with access to second server application 144-2. As noted above, accessing second server application 144-2 includes transmitting and receiving encrypted messages, file transfers, and calls. In further embodiments, second server application 144-2 transmits third configuration file 147 to first client device 110 to further update first configuration file 143. In this way, first configuration file 143 is updated from time-to-time.

Turning to FIGS. 2A and 2B, an exemplary process 200 for updating the first configuration file according to a first embodiment of the disclosure is illustrated. In block 205, first client device 110 transmits a first connection request to a first server. As noted above, the first connection request originates from first client application 142 executing on first client device 110. Additionally, first client device encrypts the first connection request before transmitting the first connection request to the first server. Preferably, the first connection request is encrypted according to a secure communication protocol, such as TLS or equivalent protocol. Alternatively, the first connection request is encrypted according to a proprietary protocol.

In block 210, first client device 110 receives a first timestamp associated with the second configuration file 145. The first timestamp indicates the date and time that second configuration file 145 was last updated. In block 215, first client application 142, executing on first client device, determines whether the first timestamp is more recent than a second timestamp. The second timestamp indicates the date and time that first configuration file 143 was last updated. If the first timestamp is not more recent than the second timestamp, first client application 142 accesses a first service, such as first server application 144-1, provided by first server 140-1.

When the first timestamp is more recent than the second timestamp, first client application 142 pulls the second configuration file from the first server in block 225. Preferably, first client application 142 generates a pull request for second configuration file 145 and transmits the pull request to first server 140-1. In response to the pull request, first server 140-1 transfers second configuration file 145 to first client device 110. Second configuration file 145 is received at the first client device 110, which determines whether a first signature of second configuration file 145 is valid in block 230. In this regard, first client device 110 obtains a first public key associated with first server 140-1. In some embodiments, first client device 110 verifies the first public key via first certificate authority 150. When the first public key is valid, first client device 110 uses the first public key to verify the first signature of second configuration file 145 according to a signature verification algorithm. When the first signature is invalid, first client device 110 discards second configuration file 145 in block 235. Discarding second configuration file 145 includes, for example, deleting second configuration file 145 from first client device 110. Further, first client device 110 may repeat the process of pulling second configuration file 145 from first server 140-1 when the first signature is invalid.

However, when the first signature of second configuration file is valid, first client application 142 updates first configuration file 143 in block 240. In some embodiments, first client application 142 replaces first configuration file 143 with second configuration file 145 received from first server 140-1. Alternatively, second configuration file 145 includes instruction of which fields of first configuration file 143 are to be updated. In these embodiments, first client application 142 updates first configuration file 143 based on the instructions included in second configuration file 145. In still further embodiments, first client application 142 merges first configuration file 143 and second configuration file 145, overwriting portions of first configuration file 143 with the updated portions of second configuration file 145.

In block 245, first client device 110 disconnects from first server 140-1. First client device 110 terminates the connection when first client device 110 is done accessing the services or back-end applications provided by first server 140-1. Alternatively, first client device 110 closes the connection to first server 140-1 after receiving second configuration file 145. In further embodiments, first server 140-1 closes the connection between first client device 110 and first server 140-1. This may be done in response to receiving an acknowledgement that first client device 110 has received second configuration file 145. In still further embodiments, updating first configuration file 143 on first client device 110 may initiate a restart of first client application 142. Restarting first client application 142 may terminate the connection between first client device 110 and first server 140-1.

At the next connection attempt—and each subsequent connection attempt, first client device 110 obtains a second server 140-2 from first configuration file 143 in block 250. As will be shown in greater detail below, a user of first client device 110 selects a second server 140-2 at random from first configuration file 143. Alternatively, a user of first client device 110 obtains a status of each of the plurality of second servers and selects one of the second servers from the plurality of second servers. According to some embodiments, first client application 142 randomly selects a different second server 140-2 from the plurality of second servers at each connection attempt. To ensure that a second server is not repeated, first client application 142 removes the second server from first configuration file 143 after a successful connection. In alternative embodiments, first client application 142 sets a flag to indicate that first client device 110 has previously connected to the second server. Accordingly, first client device 110 hops from second server to second server at each connection attempt. By regularly changing with which second server the first client device connects, first client device 110 hops between servers making it more difficult for eavesdroppers and censors to monitor and restrict the network traffic of first client device 110.

After selecting a second server from first configuration file 143, first client device 110 transmits a second connection request to the second server in block 255. As previously discussed, the second server may not be located in a CDN.

Accordingly, the second connection request is transmitted over a secure channel, such as a TLS-secured connection, directly to the second server. Alternatively, the second server is located in a CDN, and the second connection request is routed to the second server via the domain fronting. In block 260, first client device 110 accesses the first service provided by second server 140-2. The first service is typically a back-end, server application. In preferred embodiments, the first service is a back-end, secure communication application that facilitates the transmission of encrypted communications between users of the first client application.

Figure 3:
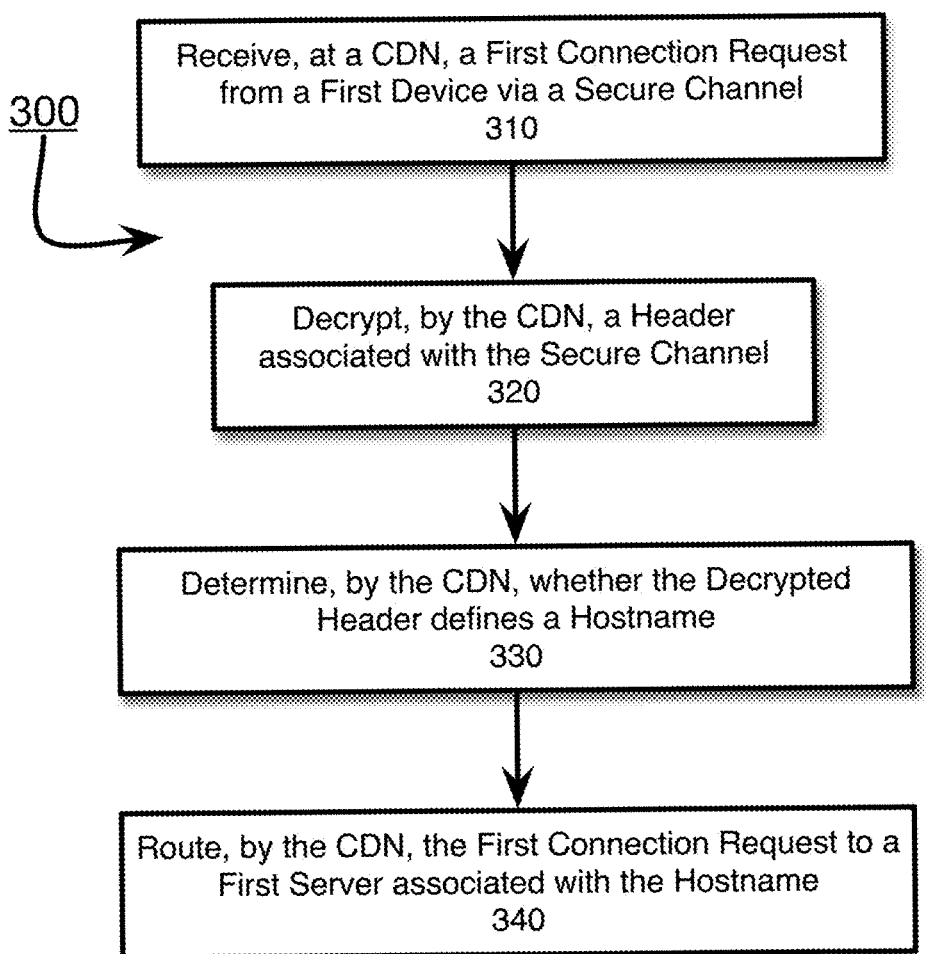
FIG. 3 illustrates a method of a content delivery network routing information to an appropriate endpoint.

As noted above, domain fronting is an ancillary benefit realized by CDNs that obfuscates the endpoint of network traffic to eavesdroppers and censors. FIG. 3 illustrates an exemplary process 300 of how CDN 130 handles requests for services hosted by CDN 130.

In block 310, a first connection request is received from first client device 110 via a secure channel. In preferred embodiments, the secure channel is a TLS-secured internet connection. The first connection request includes a first domain name, that identifies CDN 130, and a second, encrypted domain name. In preferred embodiments, the second domain name is included in a hostname field (e.g., Server Name Indication (SNI)) in an encrypted TLS-header. In block 320, CDN 130 decrypts the encrypted header. In particular, CDN 130 decrypts the TLS-header. In block 330, CDN 130 determines whether the decrypted TLS-header defines a hostname om the hostname field. In block 340, CDN 130 routes the first connection request to first server 140-1 associated with the hostname contained in the decrypted TLS-header. Encrypting the address of the true endpoint hides the destination from eavesdroppers and censors, thereby allowing users to connect to services and applications that would otherwise be blocked.

Figure 4:
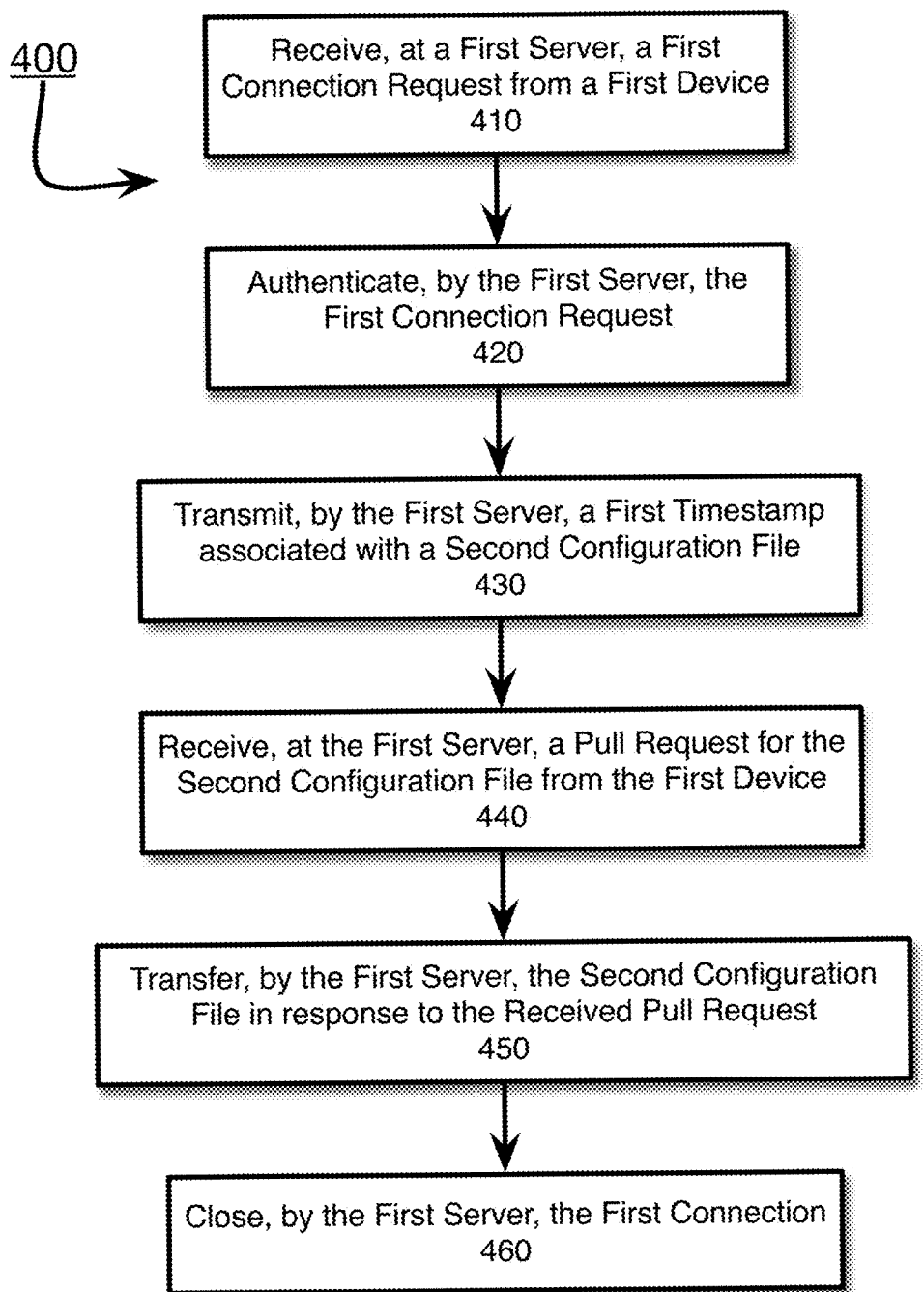
FIG. 4 illustrates a method of a server providing a first configuration file to a client device according to a first embodiment of the disclosure.

To provide first client device 110 with access to service, first server 140-1 takes a number of steps to ensure first client application 142 is up-to-date. FIG. 4 illustrates a process 400 for providing first client device 110 with second configuration file 145.

In block 410, first server 140-1 receives a first connection request from first client device 110. In preferred embodiments, the first connection request is received from first client device 110 via CDN 130. In block 420, first server 140-1 authenticates the first connection request. In preferred embodiments, the authentication includes verifying the authenticity of first client application 142, verifying the identity of the first user, or any combination thereof. In some embodiments, the first connection request includes authentication information, such as a signature of first client application 142, a username and password of the first user, a blob of the username and password of the first user, or any combination thereof. When the first connection request is valid, first server 140-1 transmits a first timestamp associated with second configuration file 145 in block 430. According to some embodiments, the first timestamp is transmitted to first client application 142 by default, each time a connection request is received by first server 140-1. In other embodiments, the first connection request includes a request for a timestamp of the most recent configuration file. In further embodiments, first server 140-1 transmits the first timestamp in response to a flag, or an equivalent notification, set by an administrator indicating that second configuration file 145 has been updated. For example, the administrator indicates that the configuration file associated with a network identifier or a security group identifier has been updated by setting a flag. Accordingly, first server 140-1 transmits the first timestamp to allow first client application 142 to determine whether first client application 142 has the most recent version of configuration file.

When first client device 110 determines that first configuration file 143 should be updated, first server 140-1 receives a pull request for second configuration file 145 from first client device 110 in block 440. In block 450, first server 140-1 transfers second configuration file 145 to first client device 110 in response to the received pull request. In block 460, first server 140-1 closes the first connection with first client device 110. Closing the first connection may be in response to first client device 110 terminating the connection when first client device 110 is done accessing the services provided by first server 140-1. Alternatively, first server 140-1 closes the connection between first client device 110 and first server 140-1 in response to receiving an acknowledgement that first client device 110 has received second configuration file 145.

Figure 5A:
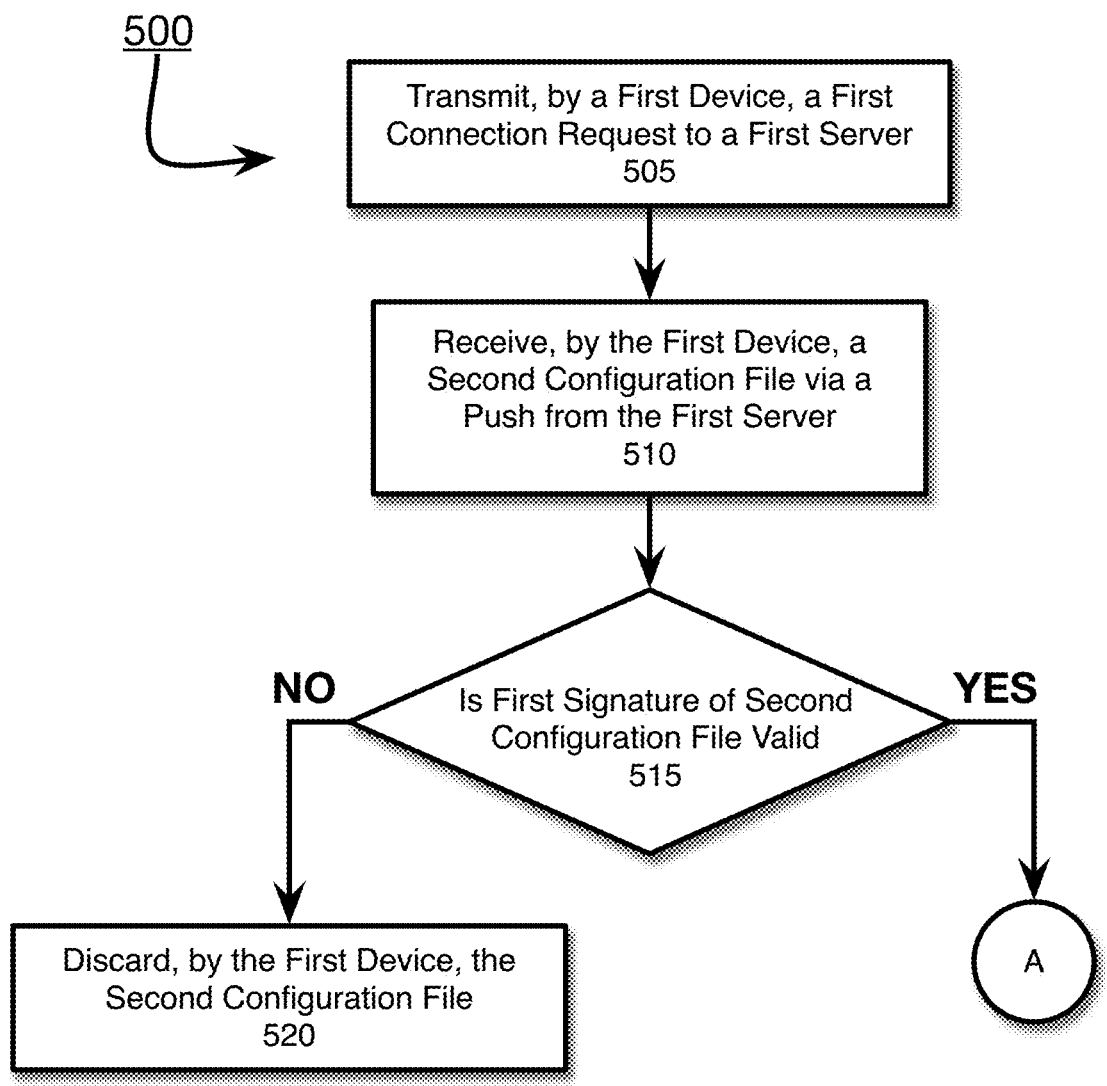
FIGS. 5A and 5B show a process for obtaining a first configuration file according to a second embodiment of the disclosure.
Figure 5B:
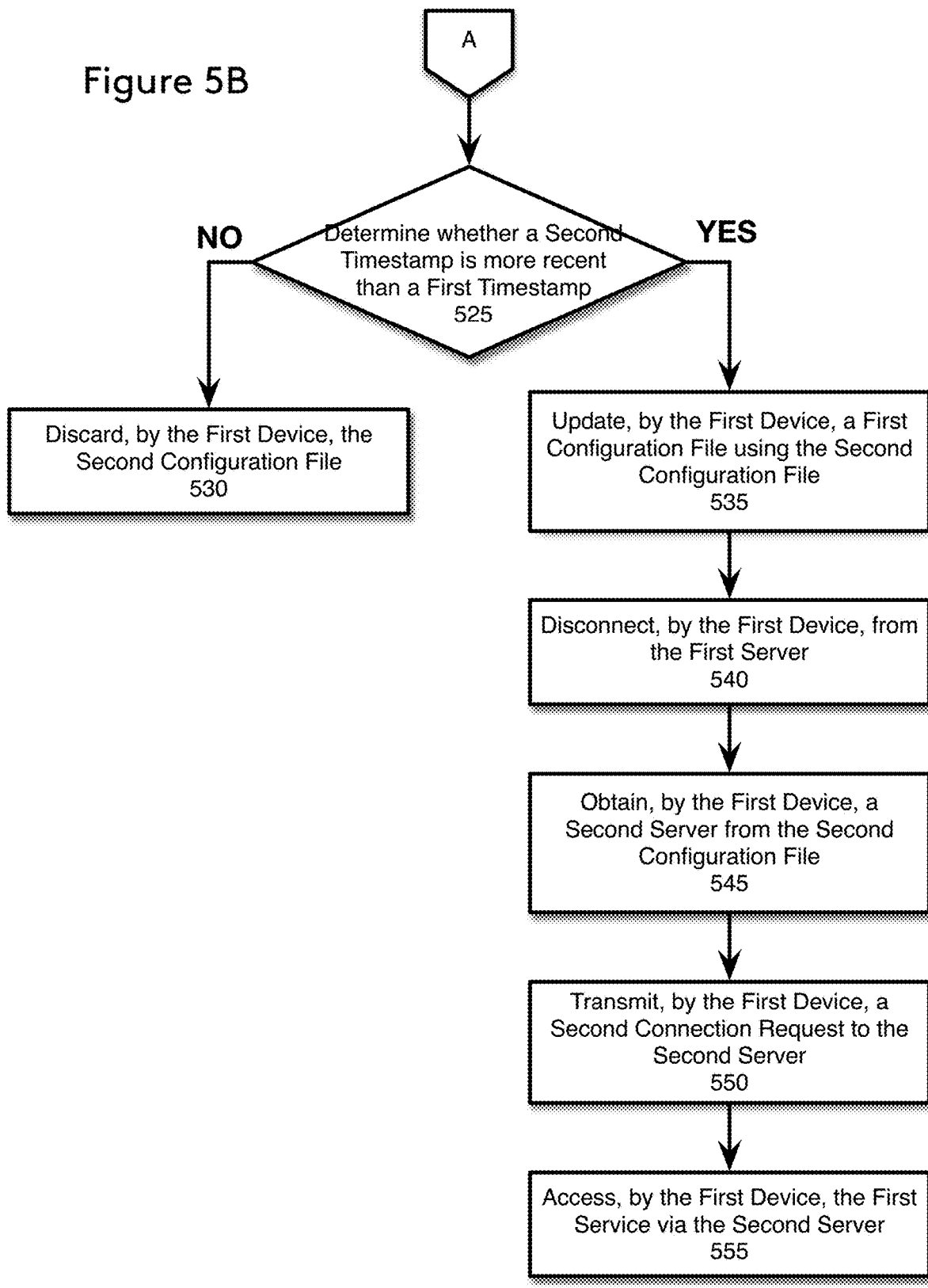

In an alternative embodiment, an administrator has the ability to push configuration updates to client applications located on one or more client devices. FIGS. 5A and 5B illustrate a process 500 for a client device receiving a configuration file pushed from a server.

In block 505, first client device 110 transmits a first connection request to first server 140-1. As noted above, the first connection request is transmitted to first server 140-1 over a secure channel, such as one secured according to TLS. After transmitting the first connection request to first server 140-1, first client device 110 receives second configuration file 145 from first server 140-1 in block 510. In preferred embodiments, first server 140-1 pushes second configuration file 145 to first client device 110. In block 515, first client device 110 determines whether a first signature of second configuration file 145 is valid. In preferred embodiments, first client device verifies the first signature of second configuration file 145 using a public key of first server 140-1 and a signature verification algorithm. When the first signature is invalid, first client device 110 discards second configuration file 145 in block 520. Preferably, first client device 110 deletes second configuration file 145. When the first signature is valid, however, process 500 proceeds to block 525, wherein first client device 110 determines whether a second timestamp, associated with second configuration file 145, is more recent than a first timestamp, associated with first configuration file 143 located on the first device. If the second timestamp is not more recent than the first timestamp, first client device 110 discards second configuration file 145.

However, when the second timestamp is more recent than the first timestamp, first client device 110 updates first configuration file 143 using second configuration file 145 received from first server 140-1 in block 535. As noted above, updating first configuration file 143 may include updating first configuration file 143, replacing first configuration file 143 with second configuration file 145, or merging first configuration file 143 and second configuration file 145. In block 540, first client device 110 disconnects from first server 140-1. As noted above, the first connection is terminated when first client device 110 is done accessing the services provided by first server 140-1, after receiving second configuration file 145 from first server 140-1, or when the first connection is closed by first server 140-1. At subsequent connection attempts, first client device 110 selects second server 140-2 from first configuration file 143 in block 545. As noted above, second server 140-2 is selected at random from the plurality of second servers contained in first configuration file 143 at each connection attempt. Additionally, first client application 142 may take precautionary measures to reduce the likelihood that a second server is not repeated. By randomly selecting a second server at each connection attempt, first client device 110 hops from one server to another at each connection request, making it more difficult for eavesdroppers and censors to monitor and block the network traffic of the first client device.

In block 550, first client device transmits a second connection request to second server 140-2. In preferred embodiments, the second connection request is transmitted over a secure channel, such as a TLS-secured connection, directly to second server 140-2. Alternatively, second server 140-2 may be located in a CDN. Accordingly, the second connection request is routed to second server 140-2 via the domain fronting techniques discussed above. In block 560, first client device 110 accesses the services provided by second server 140-2.

Figure 6:
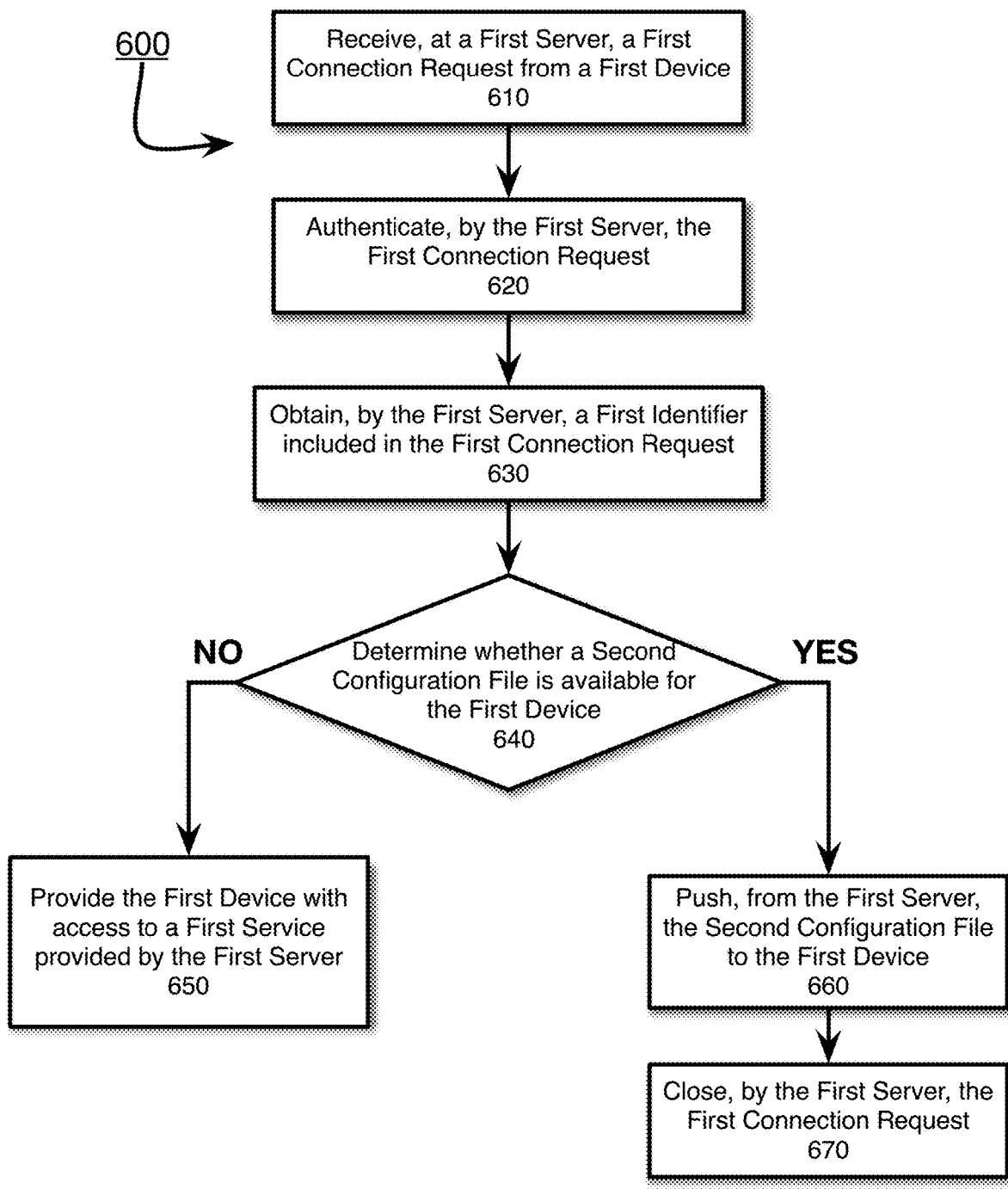
FIG. 6 illustrates a method of a server providing a first configuration file to a client device according to a second embodiment of the disclosure.

Turning to FIG. 6, a process 600 for pushing a configuration file from first server 140-1 to first client device 110 is shown. In block 610, first server 140-1 receives a first connection request from first client device 110. In block 620, first server 140-1 authenticates the first connection request received from first client device 110. When the first connection request is valid, first server 140-1 obtains a first identifier included in the connection request in block 630. In preferred embodiments, the first identifier is a network identifier that identifies a communication network to which first client device 110 belongs. Alternatively, the first identifier is a security group identifier that identifies a subset of users in a communication network. The first identifier is used to identify the set of permissions applicable to the user of first client application 142 executing on first client device 110.

In block 640, first server 140-1 determines whether second configuration file 145 is available for first client device 110. In preferred embodiments, first server 140-1 uses the first identifier to determine whether second configuration file 145 has been updated for the group indicated by the first identifier. Alternatively, a flag is set when second configuration file 145 has been updated for a user or a group. Accordingly, first server 140-1 checks the flag to determine if the flag has been set and a new configuration file is available. In some embodiments, first server 140-1 tracks when first configuration file 143 on first client device 110 was last updated. If a more recent configuration file exists for the user, first server 140-1 determines that second configuration file 145 exists and should be distributed to first client device 110. When first server 140-1 determines that an updated configuration file does not exist for first client device 110, first server 140-1 provides first client device with access to a first service in block 650.

However, when first server 140-1 determines that an updated configuration file does exist for first client device 110, process 600 proceeds to block 660, where first server 140-1 pushes second configuration file 145 to first client device 110. First client application 142, executing on first client device 110, receives second configuration file 145 pushed from first server 140-1 and uses second configuration file 145 to update first configuration file 143 located on first client device 110. In block 670, first server 140-1 closes the first connection with first client device 110.

Figure 7:
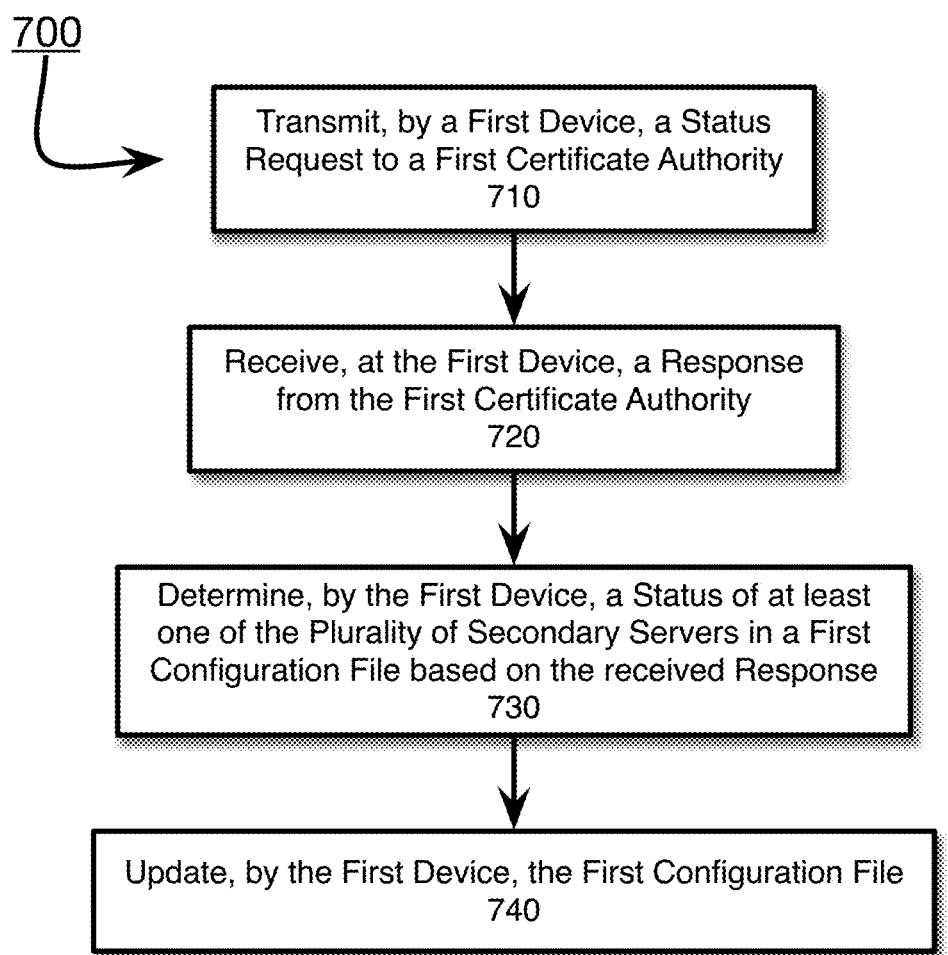
FIG. 7 shows a process for checking a status of one or more of the plurality of second servers according to an aspect of the disclosure

Because the plurality of second servers are providing access to a service or application that would otherwise be blocked, the status of the plurality of second servers is checked from time-to-time. FIG. 7 illustrates an exemplary process 700 for checking the status of one or more of the plurality of second servers.

In block 710, first client device 110 transmits a status request to first certificate authority 150. In some embodiments, the configuration file includes a public key associated with each of the one or more plurality of second servers. The status request transmitted to first certificate authority 150 inquires in to the status of the public key associated with each of the one or more plurality of second servers. In preferred embodiments, the status request includes a plurality of public keys, with each public key associated with a different one of the plurality of second servers. In block 720, first client device receives a response from first certificate authority 150. In block 730, first client device 110 determines the status of at least one of the plurality of secondary servers in first configuration file 143 based on the received response. In this regard, the response received from first certificate authority 150 indicates which public keys are still valid and which public keys have been revoked. In block 740, first client device updates first configuration file 143 based on which public keys are still valid and which public keys have been revoked. For example, those secondary servers whose public keys have been revoked will be removed from first configuration file 143.

While the status check of the plurality of second servers is preferably performed by first client device 110 from time-to-time, first server 140-1 or second server 140-2 may periodically check the status of the plurality of secondary servers contained in the second and third configuration files, respectively. By allowing the servers to also check the status of the plurality of secondary servers, the servers are able to provide an up-to-date configuration file to the client devices. This allows the client devices to make faster connections and avoid wasting time connecting to secondary servers that are blocked, or otherwise disabled, by censors.

Figure 8A:
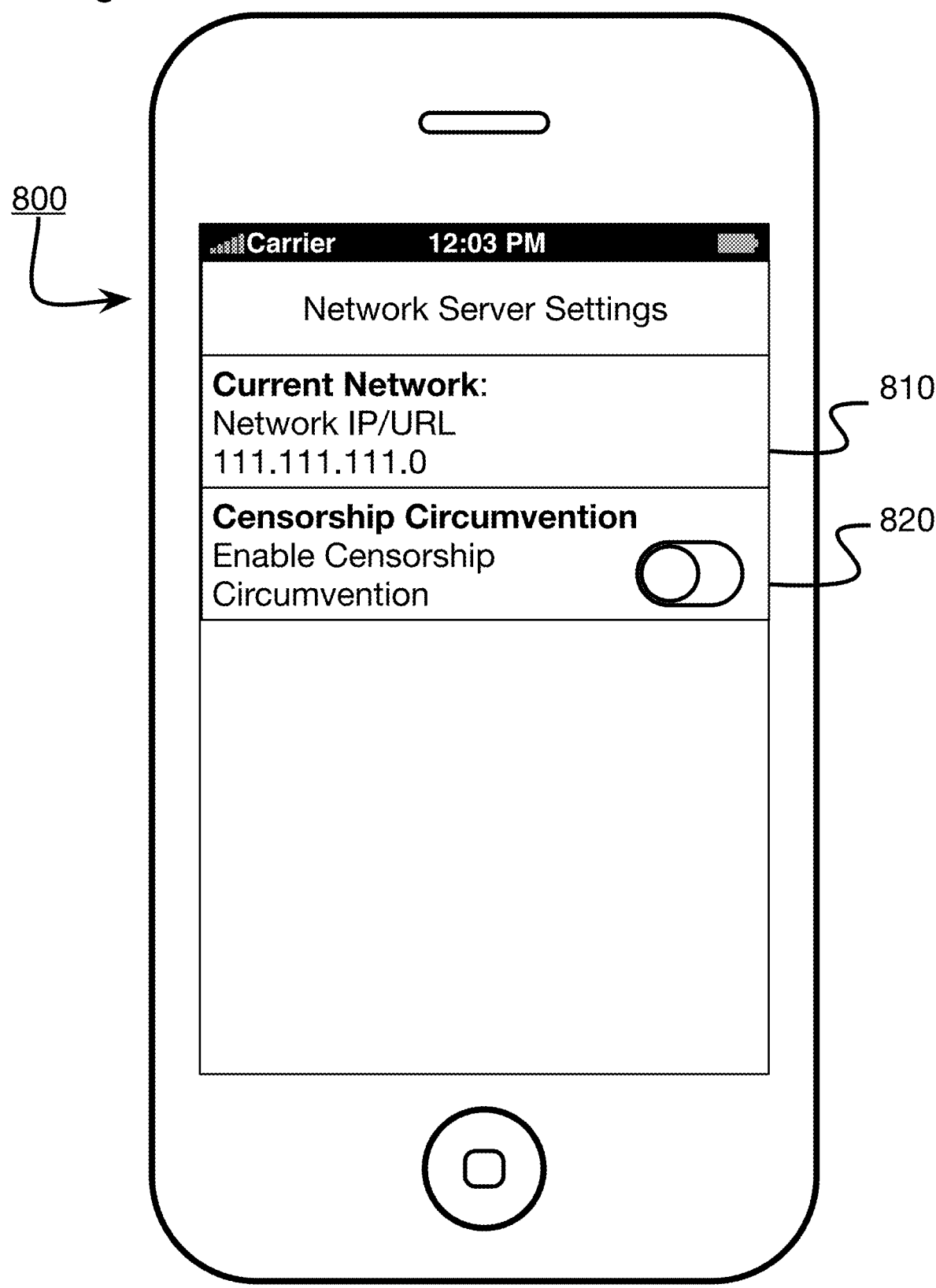
FIGS. 8A and 8B illustrate an exemplary interface for enabling censorship circumvention.
Figure 8B:
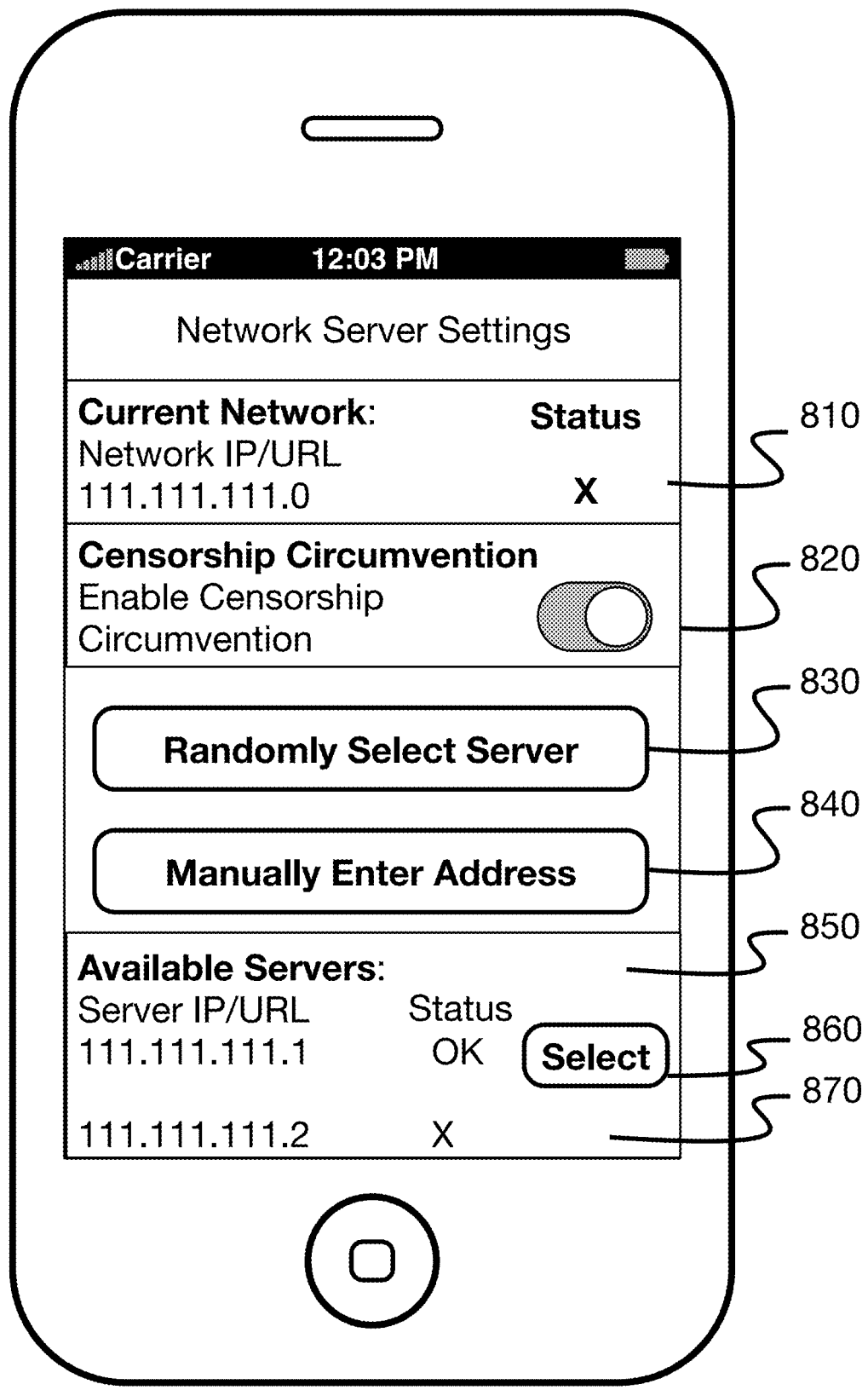

The censorship circumvention techniques described above are capable of being enabled and disabled by a user of first client device 110. FIGS. 8A and 8B illustrate an interface 800 for enabling censorship circumvention and selecting a second server 140-2 from a list of available second servers.

Interface 800 includes a first field 810 and a second field 820. First Field 810 identifies the current server and provides a first status of the current server. The current server may be defined by URL, IP address, or both. The first status of the current server indicates whether the current server is available, for example, via a check or unavailable, for example, via an "X." Second field 820 is a settings field that is configured to allow a user to enable or disable censorship circumvention. In FIG. 8A, censorship circumvention is disabled. While interface 800 shows that censorship circumvention is configurable by a user of the first device, censorship circumvention may be enabled by default. For example, an administrator enables censorship circumvention for all users in a network by default, and a user of first client device 110 will not be able to enable/disable censorship circumvention.

FIG. 8B illustrates how interface 800 changes when censorship circumvention is enabled in second field 820. When censorship circumvention is enabled, a "Randomly Select Server" button 830, a "Manually Enter Address" button 840, and an available servers field 850 are displayed. Button 830 is configured to randomly select a second server from the plurality of second servers contained in first configuration file 143. Button 840 is configured to allow the user to enter the address of the second server. The address may be an IP address or a URL. Available servers field 850 displays a list of available servers. As illustrated in FIG. 8B, available servers filed 850 presents a first available server 860 and a second available server 870. While only two available servers are shown, any number of available servers may be displayed. The first available server 860 includes an address of the first available server, a status field, and a button to select the first available server. The address of the first available server may be an IP address or a URL. The status field indicates whether the first available server is available or not. As illustrated, the first available server is available, and the user, therefore, has the option to select the first available server. The second available server 870 includes the same fields as the first available server 860. However, the second available server 870 is not available according to the status field. Therefore, interface 800 will not display a select button to allow the user to select the second available server 870.

Figure 9A:
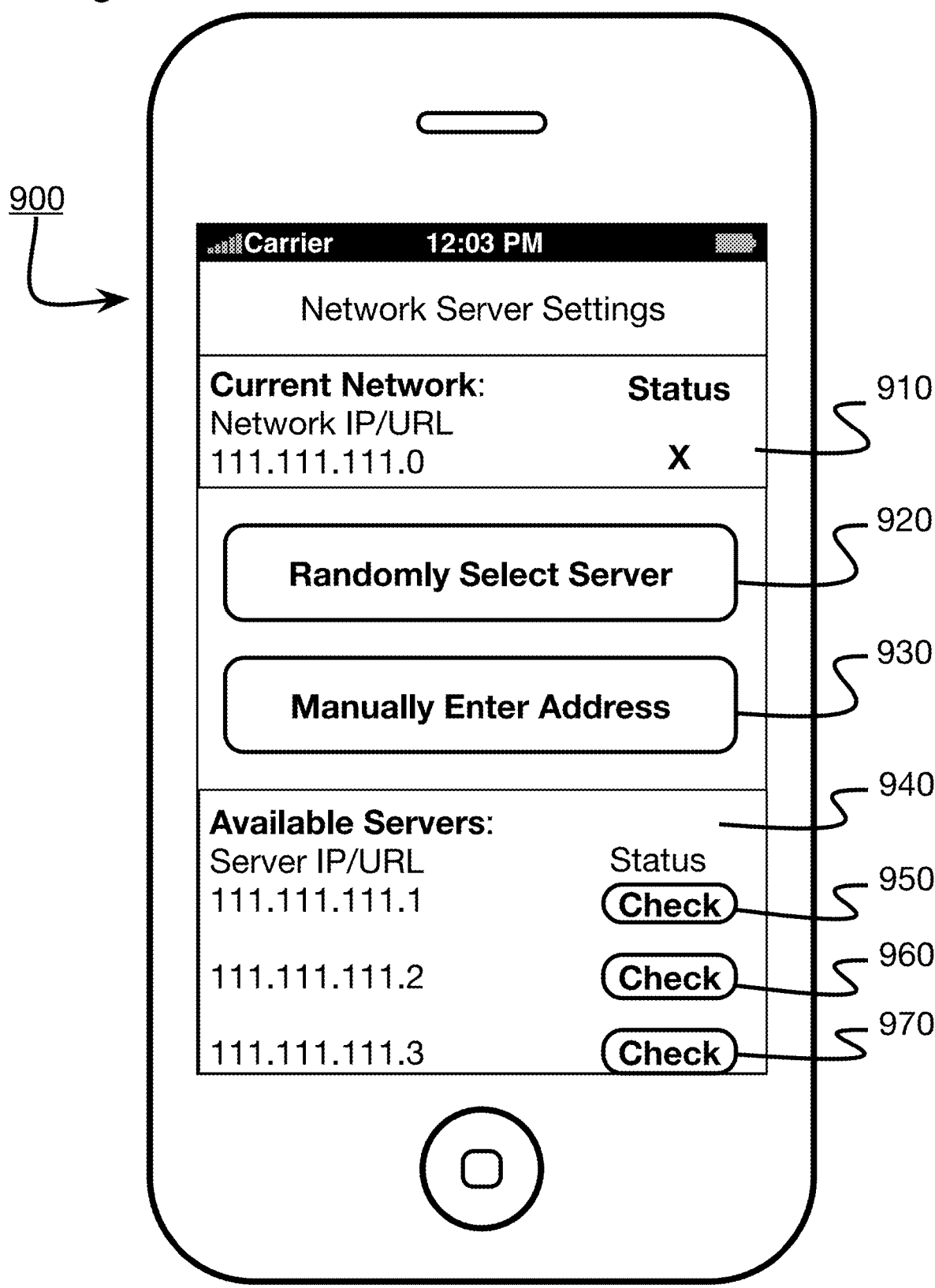
FIGS. 9A-9C show an interface for checking the status of and selecting one of the plurality of second servers
Figure 9B:
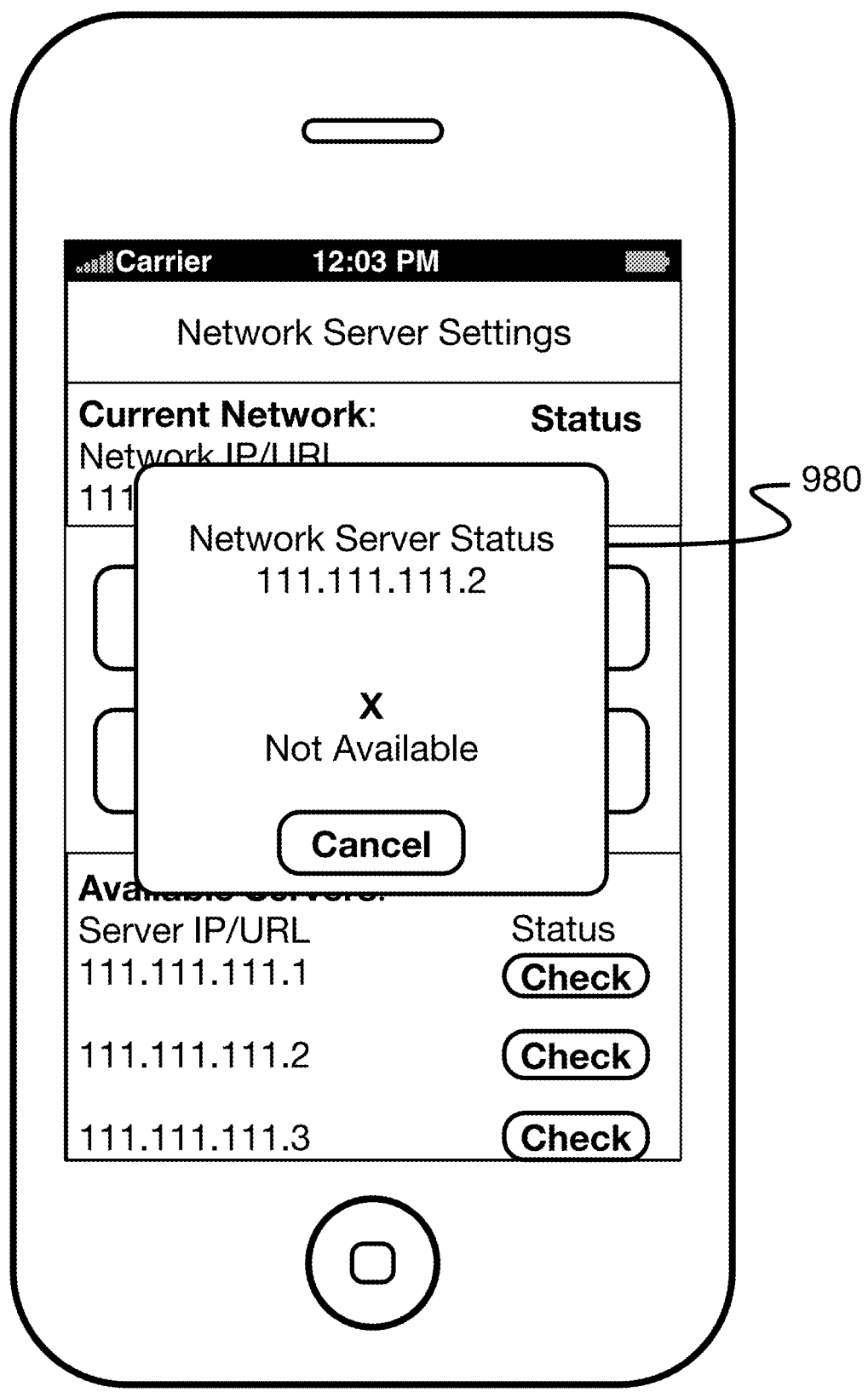
Figure 9C:
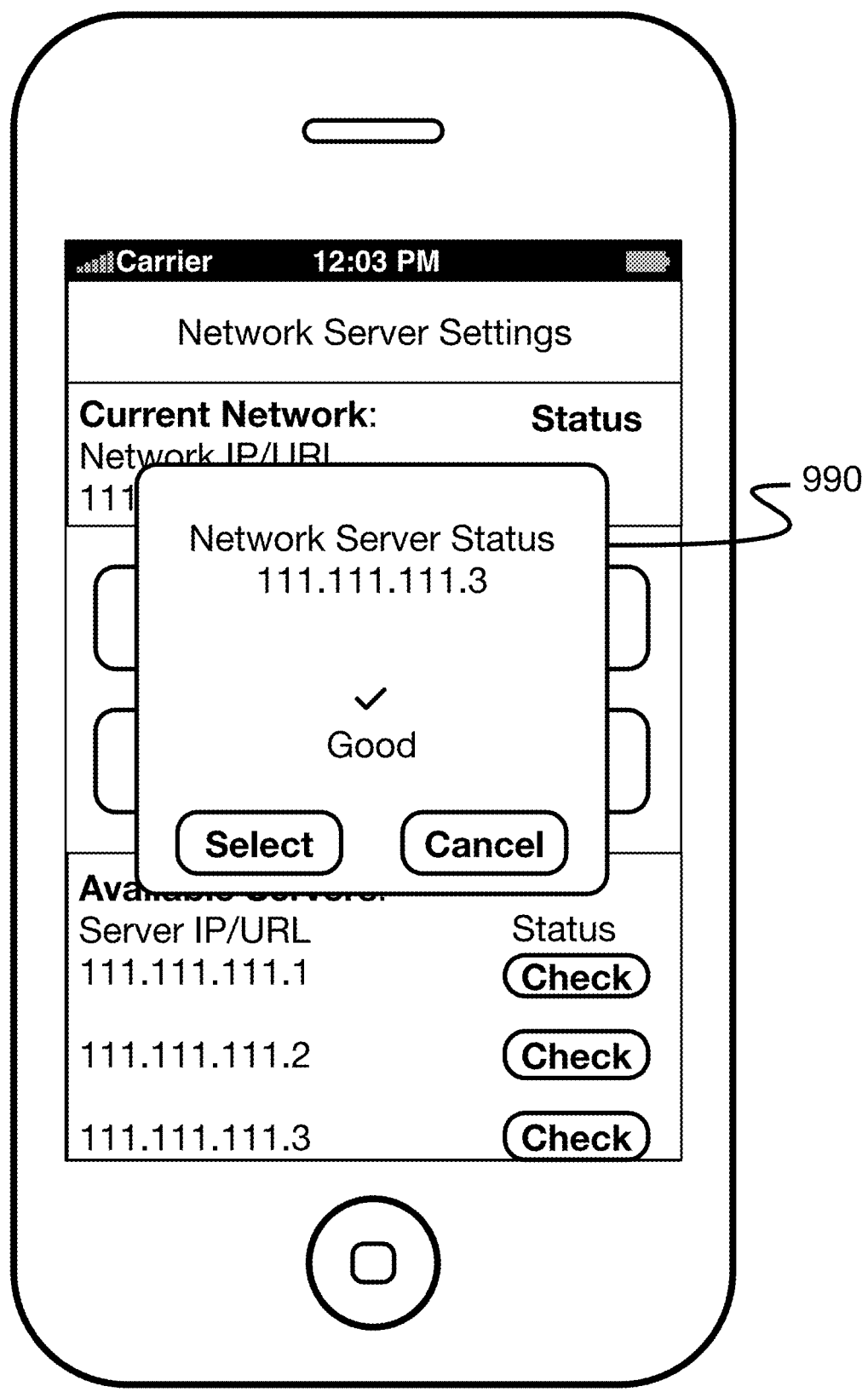

In an alternative embodiment, the status of the available servers may be unknown. FIGS. 9A-9C show an interface 900 that provides a user with the ability to check the status of one or more of the plurality of second servers before connecting to one of the plurality of secondary servers. Similar to interface 800, interface 900 includes a first field 810 that identifies the current network and provides status of the current network, a "Randomly Select Server" button 920, a "Manually Enter Address" button 930, and an available servers field 940. Available servers field 940 presents a first available server 950, a second available server 960, and a third available server. Unlike interface 800, the first available server 950 includes an address of the first available server and a status field. However, the status field does not indicate whether the first available server is available or not. Instead, the status field includes a "Check" button that allows the user to check the status of the first available server. When a user clicks the Check button, first client application 142 determines the status of the first available server. As discussed above, checking the status of the first available server includes determining whether the public key of the first available server is still valid. Alternatively, first client device 110 pings the first available server to determine whether the first available server is reachable. FIG. 9B illustrates an example of interface 900 when a listed server is not available. In particular, FIG. 9B illustrates a dialog 980 indicating that the server is not available. Accordingly, the user is presented with an option to close dialog 980 and check the status of a different server. FIG. 9C shows an example of interface 900 when a listed server is available. In this regard, dialog 990 is displayed in FIG. 9C. Dialog 990 indicates that the selected server is available, accordingly dialog 990 presents the user with the option of selecting the server or closing dialog 990 to check the status of more of the listed servers.

Figure 10:
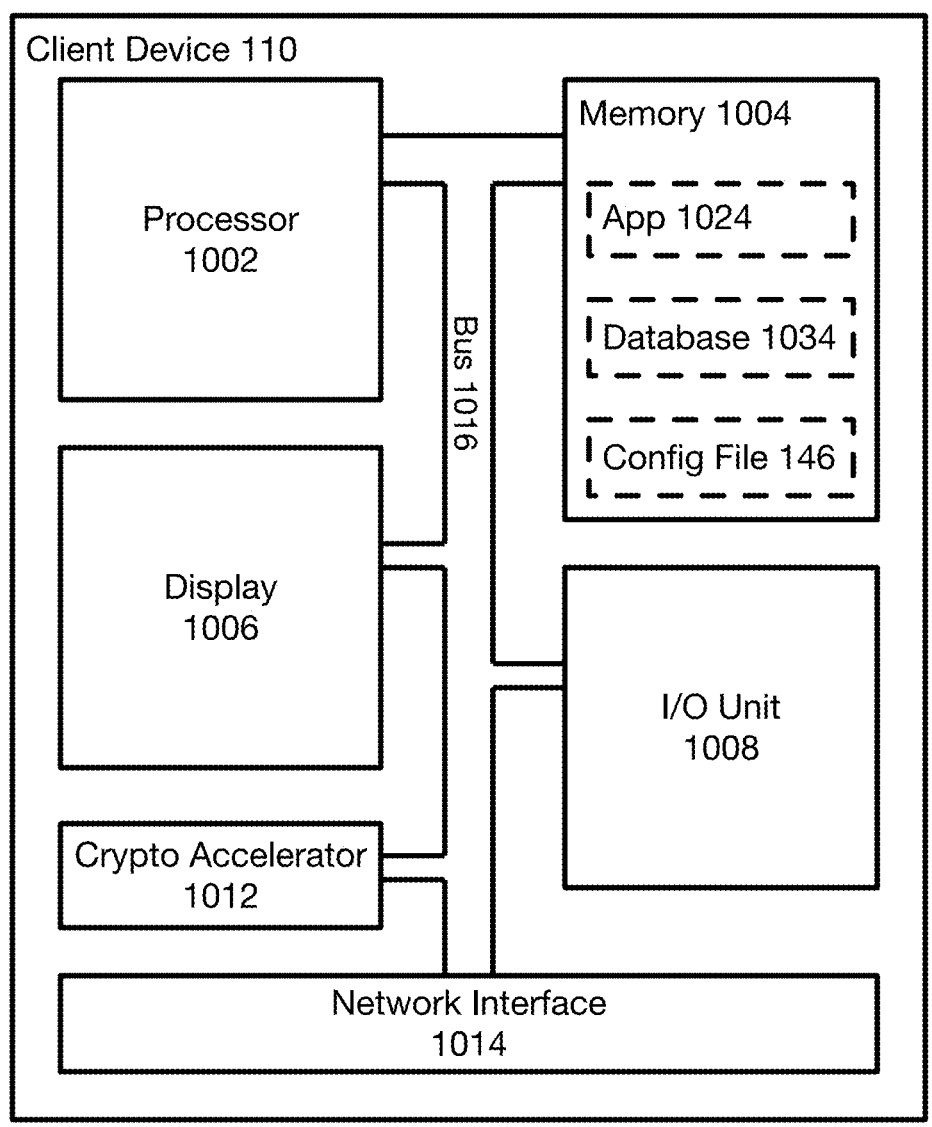
FIG. 10 illustrates an example of a client device in accordance with the present disclosure.

As discussed earlier, the application and interfaces discussed herein correspond to a secure collaboration application. The secure collaboration application includes a client-side application, executing on a first client device, and a corresponding server-side application, executing on a server. The first client device is a personal computing device, such as a mobile device, smart phone, tablet, laptop computer, desktop computer, etc. FIG. 10 illustrates a first client device 110 according to one aspect of the disclosure. In this regard, first client device 110 includes at least a processor 1002, a memory 1004, a display 1006, an I/O unit 1008, a cryptographic ("crypto") accelerator 1012, and a network interface 1014 all interconnected by bus 1016. Bus 1016 may be any type of bus architecture, including memory bus or memory controller, a peripheral bus, or a local bus using any of a variety of bus structure.

Processor 1002 is any processor capable of interacting with the components of client device 110. For example, processor 1002 may include a processor, multiprocessors, multicore processor, a dedicated controller, such as an ARM processor, an ASIC, or an FPGA, or any combination thereof. According to some examples, processor 1002 is configured to 110 transmit a connection request to a server, receive a first timestamp associated with a second configuration file, determine whether the first timestamp is more recent than a second timestamp, pull the second configuration file from the server when the first timestamp is more recent than the second timestamp, and update a first configuration file using the second configuration file pulled from the server. In an alternative embodiment, processor 1002 is also configured to transmit a connection request to a server, receive a second configuration file pushed from the first server, determine whether a first signature of the second configuration file is valid, and update a first configuration file using the second configuration file pushed from the first server. Processor 1002 is configured to use the updated configuration file to randomly connect to a different secondary server at each subsequent connection attempt.

Memory 1004 stores information accessible by processor 1002, including instructions and data that may be executed or otherwise used by the processor 1002 and/or crypto accelerator 1012. For example, memory 1004 stores instructions, such as client-side application 1024. In preferred embodiments, client-side application 1024 is a secure collaboration application that provides users with the ability to participate in voice and video calls, share encrypted content, exchange encrypted communications, and share application data. Accordingly, the processes described herein are performed by the secure collaboration application executing on the first and second devices. The first and second devices include a plurality of hardware. In operation, the secure collaboration application and the hardware of the first device operate in conjunction to perform the processes described herein.

Data stored by memory 1004 includes database 1034. In preferred embodiments, database 1034 is encrypted via an encryption algorithm, such as Advanced Encryption Standard (AES), and a 256-bit key, referred to hereinafter as a local encryption key. In some examples, database 1034 stores client-side information related to secure collaboration application 1024. For example, database 1034 indexes information related to the secure collaboration application, such as key information (e.g. a user signing key, an application signing key, etc.), user information (e.g., username, application identifier, etc.), friend information, and communications. In this regard, communications transmitted and received by the secure collaboration application, including a message identifier, a hash of the sender's username, a hash of the sender's application identifier, a hash of the receiver's username, a hash of the receiver's application identifier, the communication encryption key, and a timestamp of each communication stored in database 1034. According to some embodiments, memory 1004 stores a plurality of ephemeral keys received from a second user that would allow the first and second user to exchange encrypted communication peer-to-peer. Accordingly, memory 1004 may be any type of media capable of storing the above information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 804 may include short-term or temporary storage, as well as long-term or persistent storage.

Display 1006 is any electronic device capable of visually presenting information. In mobile devices, such as smart phones and tablets, display 1006 may be a touchscreen display. Accordingly, display 1006 is integrated with I/O unit 608 to detect user inputs, as well as output data. In computing devices, display 1006 may be an output, such as a VGA, DVI, or HDMI output, configured to connect to a monitor.

I/O unit 1008 may be configured to receive input from a user and output data to the user. As noted above, the I/O unit 1008 may work with touchscreen displays to receive input from a user. Alternatively, the I/O unit is an interface capable of interacting with input and output devices, such as keyboards, mice, monitors, printers, etc. Additionally, I/O unit 1008 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 1012 may be dedicated hardware, software, firmware, or any combination thereof that is configured to perform cryptographic operations, such as key generation, random number generation, encryption/decryption, signature generation, signature verification, etc. In preferred embodiments, crypto accelerator 1012 is a dedicated processor configured to perform cryptographic operations on behalf of processor 1002. In this regard, client-side application 1024 uses crypto accelerator 1012 to perform cryptographic operations, including generating the local encryption key, deriving the key-encrypting key, and verifying signatures of received content.

Network interface 1014 may be dedicated hardware, software, firmware, or any combination thereof that is configured to connect client device 110 to one or more devices via a communication network. In this regard, network interface 1014 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 1014 is configured to exchange data and information with at least one of a first server and a second server. The data and information may include login credentials, a token to access one or more second servers, and one or more components of the VOPRF exchange.

Figure 11:
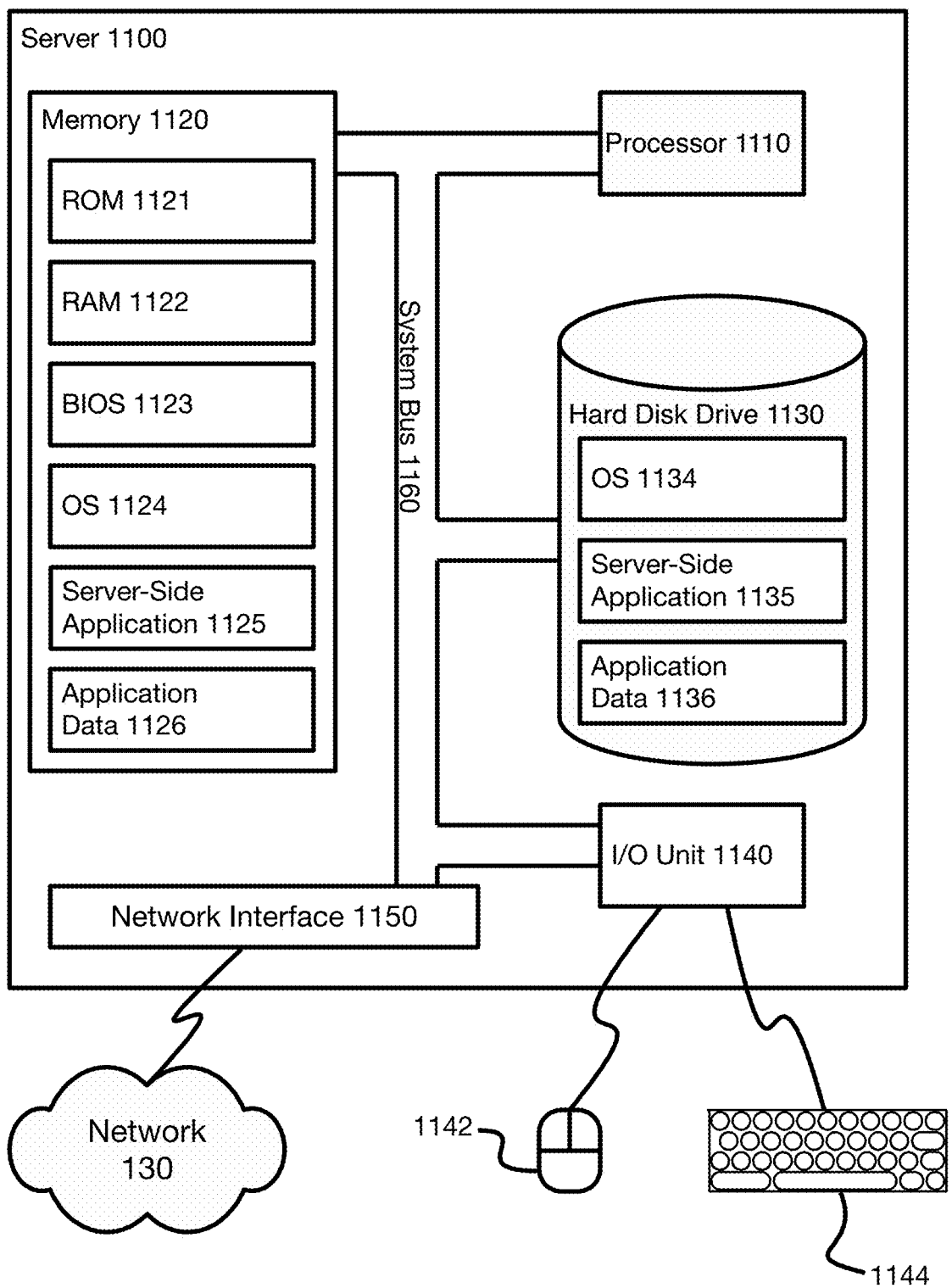
FIG. 11 illustrates an example of a server configured to perform the server functions described herein.

Turning to FIG. 11, a server 1100, configured to perform backend server functions discussed above, is shown. Server 1100 includes a processor 1110, a memory 1120, a hard drive 1130, an I/O unit 1140, and a network interface 1150, all interconnected via system bus 1160. System bus 1160 may be any type of bus architecture, including memory bus or memory controller, a peripheral bus, or a local bus using any of a variety of bus structure.

Processor 1110 is any processor capable of interacting with the variety of components of server 700. In this regard, processor 1110 may include a processor, multiprocessors, multicore processor, a dedicated controller, such as an ARM processor, an ASIC, or an FPGA, or any combination thereof. In operation, processor 1100 is configured to authenticate connection requests received from client devices, determine whether a configuration file is available for the client device, and transmit the configuration file to the client device when a first configuration file is available for the client device. According to some embodiments, processor 1100 is configured to transmit a timestamp associated the configuration file to a client device, receive a pull request from the client device for the configuration file, and transmit the configuration file to the client device in response to the pull request. In further embodiments, processor 1100 is configured to check whether a flag has been set to update a configuration file of the client device and push the updated configuration file to the client device when the flag has been set.

Memory 1120 is system memory that includes ROM 1121, RAM 1122, BIOS 1123, OS 1124, server-side application 1125, and application data 1126. The information stored in memory 1120 is accessible by processor 1110. In preferred embodiments, server-side application 1125 is a secure collaboration application that allows users to participate in voice and video calls, share encrypted content, exchange encrypted communications, and share application data via the corresponding client-side application on the users' devices. Accordingly, the processes described above are performed by the secure collaboration application executing on server 1100. In operation, the secure collaboration application and the hardware of server 1100 operate in conjunction to perform the processes described herein. Accordingly, memory 1120 may be any type of media capable of storing information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 1120 may include short-term or temporary storage, as well as long-term or persistent storage.

Application data 1126 includes a database that stores at least one of account information for one or more users, encrypted communications, etc. In preferred embodiments, application data 1126 is encrypted via an encryption algorithm, such as Advanced Encryption Standard (AES), and a 256-bit key, referred to hereinafter as a server encryption key. Additionally, application data 1126 includes at least one configuration file for at least one client device. In some embodiments, application data 1126 includes tracking information which indicates the version of the configuration file stored on each device.

Hard disk drive 1130 is a non-volatile memory configured to store operating system 1134, server-side application 1135, and application data 1136 prior to being loaded into memory 1120. In preferred embodiments, application data 1136 is encrypted using a symmetric encryption algorithm and a server encryption key.

I/O unit 1140 is configured to receive input from a user and output data to the user. As illustrated I/O unit 1140 receives input from mouse 1142 and keyboard 1144. While mouse 1142 and keyboard 1144 are illustrated, a skilled artisan would appreciate that I/O unit 1140 is capable of interacting with a plurality of different input and output devices, including touchpads, monitors, printers, etc. According to some embodiments, I/O unit 1140 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Network interface 1150 may be dedicated hardware, software, firmware, or any combination thereof that is configured to connect client device server 1100 to network 130. In this regard, network interface 1150 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 1150 is configured to receive a connection request from a client device and close the connection with the client device.

While the above disclosed embodiments and techniques allow for client devices to circumvent censors, the present disclosure provides additional advantages and improvements. For instance, distributing configuration files using the embodiments and techniques described herein improves the overall security and efficiency of deployments, security policy updates, patching bugs, and rolling-out updates. In particular, an administrator is able to provide uniform updates in a more efficient manner. Thus, the present disclosure provides a technical solution for updating configuration updates to distributed client devices, in addition to the benefits realized by allowing client devices to circumvent censors by hopping from server to server.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A method for circumventing censorship, the method comprising:
    transmitting, by a first device, a first connection request for a first service to a first server;
    receiving, by the first device, a first configuration file from the first server, wherein the first configuration file includes a plurality of second servers;
    verifying, by the first device, the first configuration file received from the first server by verifying a first signature included with the first configuration file;
    obtaining, based on a verification of the first configuration file, at least one second server from the first configuration file;
    transmitting, by the first device, a second connection request to the at least one second server;
    accessing, by the first device, the first service via the at least one second server;
    setting, by the first device and based on accessing the first service via the at least one second server, a flag indicating a prior connection to the at least one second server; and
    selecting, by the first device, a different second server from the first configuration file during each subsequent connection request.

2. The method of claim 1, wherein the first server is located in a content distribution network (CDN).

3. The method of claim 1, wherein obtaining at least one second server from the first configuration file further comprises:
    selecting, by the first device, the at least one second server from the plurality of second servers in response to an input received from a first user.

4. The method of claim 3, wherein the first user is a user of the first device.

5. The method of claim 3, wherein the first user is an administrator.

6. The method of claim 1, wherein the plurality of second servers are configured to receive login requests from the first device and provide the first device with the first service.

7. The method of claim 1, further comprising:
    receiving, by the first device, a first timestamp associated with the first configuration file in response to the first connection request being transmitted to the first server; and
    determining, by the first device, whether the first timestamp is more recent than a second timestamp, wherein the second timestamp is associated with a second configuration file that is present on the first device.

8. The method of claim 7, wherein receiving the first configuration file from the first server further comprises:
    pulling, by the first device, the first configuration file from the first server when the first timestamp is more recent than the second timestamp.

9. The method of claim 1, further comprising:
    determining, by the first device, whether a first timestamp associated with the first configuration file received from the first server is more recent than a second timestamp, wherein the second timestamp is associated with a second configuration file that is present on the first device; and
    updating, by the first device, the second configuration file using the first configuration file when the first timestamp is more recent than the second timestamp.

10. The method of claim 9, further comprising:
    deleting, by the first device, the first configuration file when the second timestamp is more recent than the first timestamp.

11. A system for circumventing censorship, comprising:
    a first interface configured to transmit a first connection request for a first service to a first server, receive a first configuration file from the first server, wherein the first configuration file includes a plurality of second servers, and transmit a second connection request to a second server;
    a processor configured to verify the first configuration file received from the first server by verifying a first signature included with the first configuration file, select the second server from the first configuration file, access the first service via the second server, set a flag indicating a prior connection to the second server based on accessing the first service via the second server, and select a different second server from the first configuration file during each subsequent connection request; and
    a memory coupled to the processor and configured to provide the processor with instructions.

12. The system of claim 11, comprising:
    a second interface configured to enable censorship circumvention.

13. The system of claim 12, wherein the second interface is further configured to receive a selection of a second server from a user input.

14. The system of claim 12, wherein the second interface is further configured to check a status of one or more of the second servers contained in the first configuration file.

15. A non-transitory computer-readable medium comprising instructions that when, executed by at least one processor, perform the steps of:

transmitting a first connection request for a first service to a first server;

receiving a first configuration file from the first server, wherein the first configuration file includes a plurality of second servers;

verifying the first configuration file received from the first server by verifying a first signature included with the first configuration file;

obtaining, based on a verification of the first configuration file, at least one second server from the first configuration file;

transmitting a second connection request to the at least one second server;

accessing the first service via the at least one second server;

setting, based on accessing the first service via the at least one second server, a flag indicating a prior connection to the at least one second server; and selecting a different second server from the first configuration file during each subsequent connection request.

16. The method of claim 1, further comprising:

removing, by the first device and based on accessing the first service via the at least one second server, the at least one second server from the first configuration file.

17. The method of claim 1, wherein the second connection requests comprises:

a first domain name identifying a content delivery network; and a second encrypted domain name identifying a hostname associated with the first service.

18. The method of claim 17, wherein the at least one second server comprises a decryption key to decrypt the second encrypted domain name to route the second connection request to a third server associated with the first service.

* * * * *

UNITED STATES PATENT AND TRADEMARK OFFICE
CERTIFICATE OF CORRECTION

PATENT NO. : 10,992,741 B2
APPLICATION NO. : 16/102132
DATED : April 27, 2021
INVENTOR(S) : Christopher Dowd et al.

It is certified that error appears in the above-identified patent and that said Letters Patent is hereby corrected as shown below:

On the Title Page

Item (72) Inventors:
"Christopher Dowd, Belleville, NJ (US)
Christopher Lalonde, Austin, TX (US)
Thomas Michael Leavy, River Edge, NJ (US)
Arjun Bhatnagar, Matawan, NJ (US)
Dipakkumar R. Kasabwala, Edison, NJ (US)
David Lautz, New York, NY (US)
Matthew Downs, Brooklyn, NY (US)"

Should read as:
--Christopher Dowd, Belleville, NJ (US)
Christopher Lalonde, Austin, TX (US)
Thomas Michael Leavy, River Edge, NJ (US)
Arjun Bhatnagar, Matawan, NJ (US)
Dipakkumar R. Kasabwala, Edison, NJ (US)
David Lautz, New York, NY (US)
Matthew Downs, Brooklyn, NY (US)
Peter Bryan Jensen, Seattle, WA (US)--

Signed and Sealed this
Fifth Day of July, 2022

Katherine Kelly Vidal
*Director of the United States Patent and Trademark Office*